US011881215B2

(12) United States Patent
Park et al.

(10) Patent No.: US 11,881,215 B2
(45) Date of Patent: Jan. 23, 2024

(54) ELECTRONIC DEVICE AND OPERATION METHOD OF SAME

(71) Applicant: Samsung Electronics Co., Ltd., Gyeonggi-do (KR)

(72) Inventors: Suneung Park, Gyeonggi-do (KR); Taekwang Um, Gyeonggi-do (KR); Jaeyung Yeo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 17/281,662

(22) PCT Filed: Oct. 10, 2019

(86) PCT No.: PCT/KR2019/013281
§ 371 (c)(1),
(2) Date: Mar. 31, 2021

(87) PCT Pub. No.: WO2020/076087
PCT Pub. Date: Apr. 16, 2020

(65) Prior Publication Data
US 2022/0013115 A1  Jan. 13, 2022

(30) Foreign Application Priority Data

Oct. 11, 2018  (KR) .................. 10-2018-0120854

(51) Int. Cl.
*G10L 15/22* (2006.01)
*G06F 3/0482* (2013.01)
(Continued)

(52) U.S. Cl.
CPC ............ *G10L 15/22* (2013.01); *G06F 3/0482* (2013.01); *G06F 3/0484* (2013.01); *G06F 3/167* (2013.01);
(Continued)

(58) Field of Classification Search
USPC ...................................... 704/1–504
See application file for complete search history.

(56) References Cited

U.S. PATENT DOCUMENTS 6,263,375 B1   7/2001  Ortega
6,993,511 B2 *  1/2006  Himmelstein ......... G06Q 40/00
                                              705/37
(Continued)

FOREIGN PATENT DOCUMENTS

EP    3588258 A1    3/2018
JP    5819269 A    11/2015
(Continued)

OTHER PUBLICATIONS

Korean Office Action dated May 31, 2023.
Notice of Patent Grant dated Dec. 7, 2023.

*Primary Examiner* — Marcus T Riley
(74) *Attorney, Agent, or Firm* — Cha & Reiter, LLC

(57) ABSTRACT

Various embodiments of the present invention relate to a method for providing an intelligent assistance service, and an electronic device performing same. According to an embodiment, the electronic device includes a display, a communication interface, at least one processor, and at least one memory, wherein the memory is configured to store a task customized by a user and mapped to any one among a selected word, phrase, or sentence. The memory may store instructions which, when executed, cause the processor to: display a user interface, configured to set or change the task, on the display; display at least one utterance related to the task as text on the user interface; identify and display at least one replaceable parameter in the utterance; receive a user input, which may be used as the parameter, for selecting or inputting at least one item; and store the task including the item.

12 Claims, 18 Drawing Sheets

(51) Int. Cl.
  *G06F 3/0484* (2022.01)
  *G06F 3/16* (2006.01)
  *G10L 15/30* (2013.01)
  *G10L 15/00* (2013.01)
  *G10L 15/18* (2013.01)

(52) U.S. Cl.
  CPC .......... *G10L 15/30* (2013.01); *G10L 15/1815* (2013.01); *G10L 2015/223* (2013.01)

(56) References Cited

U.S. PATENT DOCUMENTS

| | | | |
|---|---|---|---|
| 9,646,611 B2 | 5/2017 | Vogel et al. | |
| 2008/0114604 A1* | 5/2008 | Wei | G06F 3/0482 704/E15.04 |
| 2014/0047464 A1* | 2/2014 | Lev | H04N 21/4396 725/12 |
| 2015/0160919 A1 | 6/2015 | Kim et al. | |
| 2016/0171980 A1 | 6/2016 | Liddell et al. | |
| 2017/0186427 A1 | 6/2017 | Wang et al. | |
| 2017/0192409 A1* | 7/2017 | Kim | G05B 19/042 |
| 2017/0263248 A1* | 9/2017 | Gruber | G10L 15/02 |
| 2018/0253202 A1 | 9/2018 | Kong et al. | |
| 2018/0278740 A1* | 9/2018 | Choi | H04M 1/72403 |
| 2019/0259386 A1* | 8/2019 | Kudurshian | G06F 3/167 |
| 2019/0260866 A1* | 8/2019 | Choi | H04M 1/72469 |
| 2020/0034112 A1 | 1/2020 | Woo et al. | |
| 2021/0109703 A1 | 4/2021 | Kim et al. | |
| 2022/0013115 A1* | 1/2022 | Park | G10L 15/30 |

FOREIGN PATENT DOCUMENTS

| | | |
|---|---|---|
| KR | 10-1434515 B1 | 8/2014 |
| KR | 10-2016-0088652 A | 7/2016 |
| KR | 10-2017-0082428 A | 7/2017 |
| KR | 10-2017-0092550 A | 8/2017 |
| KR | 10-2018-0098409 A | 9/2018 |
| KR | 10-2018-0101926 A | 9/2018 |
| KR | 10-2018-0108321 A | 10/2018 |
| KR | 10-2018-0109465 A | 10/2018 |
| KR | 10-2018-0109631 A | 10/2018 |
| KR | 10-2018-0109633 A | 10/2018 |

* cited by examiner

ELECTRONIC DEVICE AND OPERATION METHOD OF SAME

CROSS REFERENCE TO RELATED APPLICATIONS

This application is a National Phase Entry of PCT International Application No. PCT/KR2019/013281, which was filed on Oct. 10, 2019, and claims a priority to Korean Patent Application No. 10-2018-0120854, which was filed on Oct. 11, 2018, the contents of which are incorporated herein by reference.

TECHNICAL FIELD

Various embodiments of the disclosure relate to a method for providing an intelligent assistance service and an electronic device for performing the same.

BACKGROUND ART

There has recently been development of an intelligent assistance service such that an intuitive interface between users and electronic devices can be provided. The intelligent assistance service may perform natural language processing regarding a user's utterance, thereby inferring the user's intent, and may process such that a control device is controlled based on the inferred user intent.

DISCLOSURE OF INVENTION

Technical Problem

A service has recently been provided such that, based on a user utterance, a task customized by the user is executed. For example, the user may map multiple tasks to a single command (for example, a shortcut command), and an electronic device, upon sensing a user utterance corresponding to a predesignated command, may execute mapped tasks subsequently or simultaneously without a following utterance.

However, there is a problem in that, since a task is related to a function of an application, it may be impossible to intuitively recognize a task that the user may designate.

Various embodiments of the disclosure described below may provide an electronic device for enabling easy designation of a task mapped to a command, and a method for operating the same.

Solution to Problem

An electronic device according to various embodiments of the disclosure may include: a display; a communication interface; at least one processor; and at least one memory, wherein the memory is configured to store a task customized by a user and mapped to any one of a selected word, phrase, or sentence, and the memory stores instructions which, when executed, cause the processor to: display a user interface configured to set or change the task on the display; display at least one utterance related to the task as text on the user interface; identify and display at least one replaceable parameter in the utterance; receive a user input for selecting or inputting at least one item usable as the parameter; and store the task including the item.

A method for operating an electronic device according to various embodiments of the disclosure may include: in response to detection of a task selection event, displaying at least one utterance related to the selected task as text; identifying and displaying at least one replaceable parameter in the utterance; receiving a user input for selecting or inputting at least one item usable as the parameter; and storing a task including the item.

An intelligent server according to various embodiments of the disclosure may include: a communication interface; at least one processor; and at least one memory, wherein the memory stores instructions which, when executed, cause the processor to: receive at least one utterance related to a task from an electronic device; identify at least one replaceable parameter in the utterance; select at least one item usable as the parameter; and transmit the selected at least one item to the electronic device.

Advantageous Effects of Invention

An electronic device and a method for operating the same, according to various embodiments, may display, in response to sensing a task selection event, at least one utterance related to the selected task as a text, may identify and display at least one replaceable parameter in the utterance, and may display at least one item usable as the parameter, thereby solving the problem of failure to intuitively recognize a task that the user may designate.

BEST MODE FOR CARRYING OUT THE INVENTION

Hereinafter, various embodiments of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Figure 1:
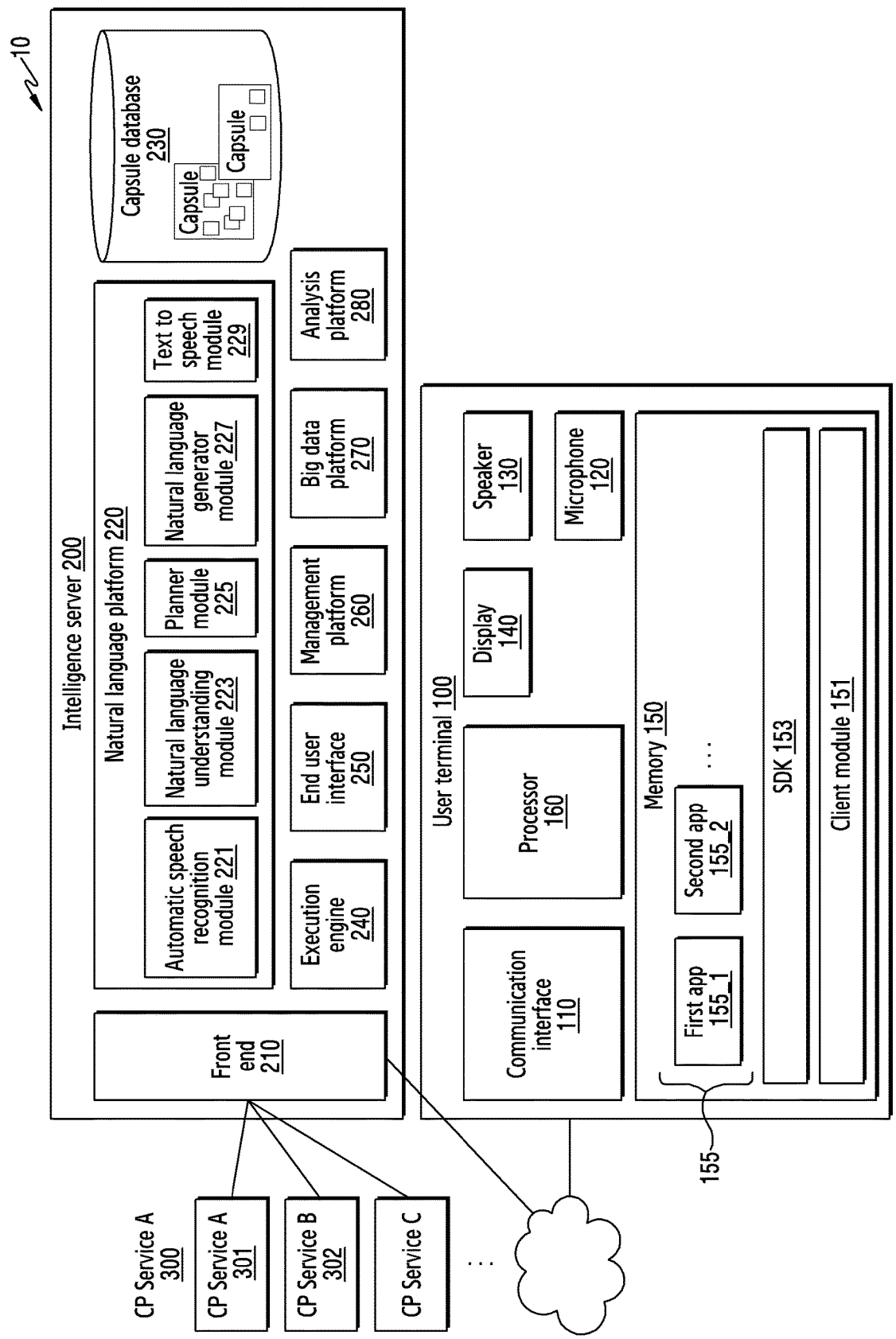
FIG. 1 is a block diagram illustrating an integrated intelligence system according to an embodiment.

FIG. 1 is a block diagram illustrating an integrated intelligence system according to an embodiment.

Referring to FIG. 1, an integrated intelligence system 10 according to an embodiment may include a user terminal 100, an intelligent server 200, and a service server 300.

The user terminal 100 according to an embodiment may be a terminal device (or an electronic device) capable of being connected to the Internet, and may include, for example, a mobile phone, a smart phone, a personal digital assistant (PDA), a notebook computer, a TV, white goods, a wearable device, an HMD, or a smart speaker.

According to the illustrated embodiment, the user terminal 100 may include a communication interface 110, a microphone 120, a speaker 130, a display 140, a memory 150, or a processor 160. The listed elements may be operatively or electrically connected to each other.

The communication interface 110 according to an embodiment may be connected to an external device and configured to transmit or receive data. The microphone 120 according to an embodiment may receive a sound (e.g., a user utterance) and convert the same to an electrical signal. The speaker 130 according to an embodiment may output the electrical signal in the form of a sound (e.g., voice). The display 140 according to an embodiment may be configured to display an image or a video. The display 140 according to an embodiment may display a graphic user interface (GUI) of an executed app (or application program).

The memory 150 according to an embodiment may store a client module 151, a software development kit (SDK) 153, and a plurality of apps 155. The client module 151 and the SDK 153 may configure framework (or a solution program) for performing a universal function. Further, the client module 151 or the SDK 153 may configure framework for processing a voice input.

The plurality of apps 155, having been stored in the memory 150 according to an embodiment, may be programs for performing a designated function. According to an embodiment, the plurality of apps 155 may include a first app 155_1 and a second app 155_2. According to an embodiment, each of the plurality of apps 155 may include a plurality of operations for performing designated functions. For example, the apps may include an alarm app, a message app, and/or a schedule app. According to an embodiment, the plurality of apps 155 may be executed by the processor 160 so as to sequentially perform at least some of the plurality of operations.

The processor 160 according to an embodiment may control the overall operation of the user terminal 100. For example, the processor 160 may be electrically connected to the communication interface 110, the microphone 120, the speaker 130, the memory 150, and the display 140 to perform designated operations.

The processor 160 according to an embodiment may perform a designated function by executing a program stored in the memory 150. For example, the processor 160 may perform the following operation of processing a voice input by executing at least one of the client module 151 or the SDK 153. The processor 160 may control, for example, the operation of the plurality of apps 155 through the SDK 153. The following operation, which has been described as the operation of the client module 151 or the SDK 153, may be performed by the processor 160.

The client module 151 according to an embodiment may receive a voice input. For example, the client module 151 may receive a voice signal corresponding to a user utterance detected through the microphone 120. The client module 151 may transmit the received voice input to the intelligent server 200. The client module 151 may transmit state information of the user terminal 100 together with the received voice input to the intelligent server 200. The state information may be, for example, execution state information of the app.

The client module 151 according to an embodiment may receive a result corresponding to the received voice input. For example, if the intelligent module 200 obtains the result corresponding to the received voice input, the client module 151 may receive the result corresponding to the received voice input. The client module 151 may display the received result on the display 140.

The client module 151 according to an embodiment may receive a plan corresponding to the received voice input. The client module 151 may display, on the display 140, a result obtained by performing the plurality of actions of an app according to the plan. The client module 151 may sequentially display, for example, a result of execution of the plurality of actions on the display. In another example, the user terminal 100 may display only a part of the result of the plurality of actions (only the result of the last action) on the display.

According to an embodiment, the client module 151 may receive a request for acquiring information required for obtaining the result corresponding to the voice input from the intelligent server 200. According to an embodiment, the client module 151 may transmit the required information to the intelligent server 200 in response to the request.

The client module 151 according to an embodiment may transmit information on a result obtained by executing a plurality of actions according to the plan to the intelligent server 200. The intelligent server 200 may identify that the received voice input is correctly processed using the result information.

The client module 151 according to an embodiment may include a voice recognition module. According to an embodiment, the client module 151 may recognize a voice input for performing a limited function through the voice recognition module. For example, the client module 151 may execute an intelligent app for processing a voice input to perform a systematic operation through a designated input (e.g., Wake up!).

The intelligent server 200 according to an embodiment may receive information related to a user voice input from the user terminal 100 through a communication network. According to an embodiment, the intelligent server 200 may change data related to the received voice input into text data. According to an embodiment, the intelligent server 200 may generate a plan for performing a task corresponding to the user voice input, based on the text data.

According to an embodiment, the plan may be generated by an artificial intelligent (AI) system. The intelligent system may be a rule-based system, a neural network-based system (e.g., a feedforward neural network (FNN), or a recurrent neural network (RNN)). Alternatively, the intelligent system may be a combination thereof or an intelligent system different therefrom. According to an embodiment, the plan may be selected from a set of predefined plans or may be generated in real time in response to a user request. For example, the intelligent system may select at least one plan from among a plurality of predefined plans.

The intelligent server 200 according to an embodiment may transmit the result according to the generated plan to the user terminal 100 or transmit the generated plan to the user terminal 100. According to an embodiment, the user terminal 100 may display the result on the display according to the plan. According to an embodiment, the user terminal 100 may display, on the display, a result obtained by performing actions according to the plan.

The intelligent server 200 according to an embodiment may include a front end 210, a natural language platform 220, a capsule database (DB) 230, an execution engine 240, an end user interface 250, a management platform 260, a big data platform 270, or an analytic platform 280.

According to an embodiment, the front end 210 may receive the received voice input from the user terminal 100. The front end 210 may transmit a response to the voice input.

According to an embodiment, the natural language platform 220 may include an automatic speech recognition module (ASR module) 221, a natural language understanding (NLU) module 223, a planner module 225, a natural language generator (NLG) module 227, or a text to speech (TTS) module 229.

The automatic speech recognition module 221 according to an embodiment may convert the voice input received from the user terminal 100 into text data. The natural language understanding module 223 according to an embodiment may detect a user's intention by using text data of the voice input. For example, the natural language understanding module 223 may detect a user's intention by performing syntactic analysis or semantic analysis. The natural language understanding module 223 according to an embodiment may recognize a meaning of a word extracted from the voice input by using a linguistic characteristic of a morpheme or a phrase (e.g., grammatical element), and may match the recognized meaning of the word to the intention so as to determine the user's intention.

The planner module 225 according to an embodiment may generate a plan by using the intention determined by the natural language understanding module 223 and a parameter. According to an embodiment, the planner module 225 may determine a plurality of domains required for performing a task based on the determined intention. The planner module 225 may determine a plurality of actions respectively included in the plurality of domains determined based on the intention. According to an embodiment, the planner module 225 may determine a parameter required for performing the plurality of determined actions or a result value output by the execution of the plurality of actions. The parameter and the result value may be defined by a concept of a designated format (or class). Accordingly, the plan may include a plurality of actions determined by the user's intention, and a plurality of concepts. The planner module 225 may gradually (or hierarchically) determine the relationship between the plurality of actions and the plurality of concepts. For example, the planner module 225 may determine the execution order of the plurality of actions determined based on the user's intention and based on the plurality of concepts. In other words, the planner module 225 may determine the execution order of the plurality of actions based on the parameter required for performing the plurality of actions and the result output by the execution of the plurality of actions. Accordingly, the planner module 225 may generate a plan including information on the relationship (ontology) between the plurality of actions and the plurality of concepts. The planner module 225 may generate a plan by using information stored in the capsule database 230 in which a set of relationships between concepts and actions is stored.

The natural language generator module 227 according to an embodiment may convert designated information in the form of text. The information converted into the form of text may be the form of a natural language utterance. The text to speech conversion module 229 may convert information in the form of text into information in the form of voice.

According to an embodiment, some or all of the functions of the natural language platform 220 may also be implemented by the user terminal 100.

The capsule database 230 may store information on the relationship between a plurality of concepts and actions corresponding to a plurality of domains. The capsule according to an embodiment may include a plurality of action objects (or action information) and concept objects (or concept information), which are included in the plan. According to an embodiment, the capsule database 230 may store a plurality of capsules in the form of a concept action network (CAN). According to an embodiment, the plurality of capsules may be stored in a function registry included in the capsule database 230.

The capsule database 230 may include a strategy registry in which strategy information required when a plan corresponding to a voice input is determined is stored. When there are a plurality of plans corresponding to the voice input, the strategy information may include reference information for determining one plan. According to an embodiment, the capsule database 230 may include a follow-up registry in which follow-up action information suggesting a follow-up action to a user in a designated context is stored. The follow-up action may include, for example, a following utterance. According to an embodiment, the capsule database 230 may include a layout registry in which layout information corresponding to information output through the user terminal 100 is stored. According to an embodiment, the capsule database 230 may include a vocabulary registry in which vocabulary information included in the capsule information is stored. According to an embodiment, the capsule database 230 may include a dialog registry in which dialog (or interaction) information with the user is stored. The capsule database 230 may update the stored object through a developer tool. The developer tool may include a function editor for updating, for example, the action object or the concept object. The developer tool may include a vocabulary editor for updating a vocabulary. The developer tool may include a strategy editor for generating and registering strategy to determine a plan. The developer tool may include a dialog editor for generating dialog with the user. The developer tool may include a follow-up editor for activating a follow-up goal and editing a following utterance that provides a hint. The follow-up goal may be determined based on a currently configured goal, a user's preference, or an environment condition. According to an embodiment, the capsule database 230 may be implemented even within the user terminal 100.

The execution engine 240 according to an embodiment may obtain the result by using the generated plan. The end user interface 250 may transmit the obtained result to the user terminal 100. Accordingly, the user terminal 100 may receive the result and provide the received result to the user. The management platform 260 according to an embodiment may manage information used by the intelligent server 200. The big data platform 270 according to an embodiment may collect user data. The analytic platform 280 according to an embodiment may manage a quality of service (QoS) of the intelligent server 200. For example, the analytic platform 280 may manage elements and a processing speed (or efficiency) of the intelligent server 200.

The service server 300 according to an embodiment may provide a designated service (e.g., food ordering or hotel booking) to the user terminal 100. According to an embodiment, the service server 300 may be a server operated by a third party. The service server 300 according to an embodiment may provide information for generating a plan corresponding to the received voice input to the intelligent server 200. The provided information may be stored in the capsule database 230. Further, the service server 300 may provide result information to the intelligent server 200 according to the plan.

In the integrated intelligence system 10 described above, the user terminal 100 may provide various intelligent services to the user in response to the user input. The user input may include, for example, an input through a physical button, a touch input, or a voice input.

According to an embodiment, the user terminal 100 may provide a voice recognition service through an intelligent app (or a voice recognition app) stored in the user terminal 100. In this case, for example, the user terminal 100 may recognize a user utterance or a voice input received through the microphone and provide a service corresponding to the recognized voice input to the user.

According to an embodiment, the user terminal 100 may perform a designated operation by itself or together with the intelligent server and/or the service server based on the received voice input. For example, the user terminal 100 may execute an app corresponding to the received voice input, and may perform a designated operation through the executed app.

According to an embodiment, when the user terminal 100 provides the service together with the intelligent server 200 and/or the service server, the user terminal may detect a user utterance through the microphone 120 and generate a signal (or voice data) corresponding to the detected user utterance. The user terminal may transmit the voice data to the intelligent server 200 through the communication interface 110.

The intelligent server 200 according to an embodiment may, in response to the voice input received from the user terminal 100, generate a plan for performing a task corresponding to the voice input or a result obtained by executing an action according to the plan. The plan may include, for example, a plurality of actions for performing a task corresponding to the voice input of a user and a plurality of concepts related to the plurality of actions. The concept may be obtained by defining a parameter input for the execution of the plurality of actions or a result value output by the execution of the plurality of actions. The plan may include the relationship between the plurality of actions and the plurality of concepts.

The user terminal 100 according to an embodiment may receive the response through the communication interface 110. The user terminal 100 may output a voice signal generated inside the user terminal 100 to the outside through the speaker 130, or may output an image generated inside the user terminal 100 to the outside through the display 140.

Figure 2:
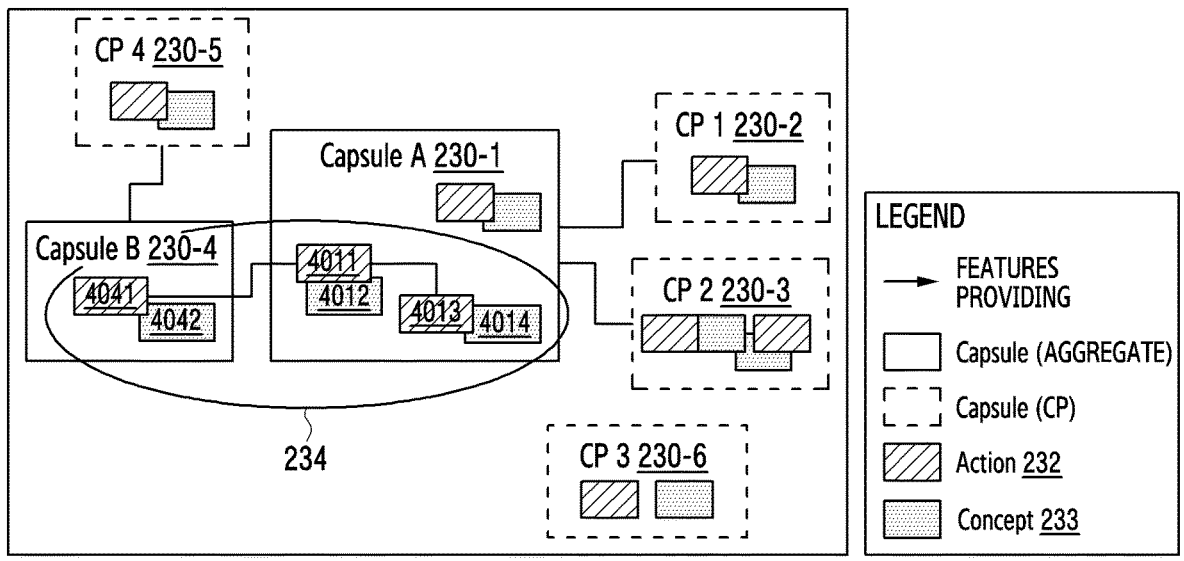
FIG. 2 illustrates a type of storage of information on the relationship between a concept and an action in a database according to an embodiment.

FIG. 2 illustrates a type of storage of information on the relationship between a concept and an action in a database according to various embodiments.

A capsule database (e.g., the capsule database 230) of the intelligent server 200 may store capsules in the form of a concept action network (CAN) 231. The capsule database may store an action of processing a task corresponding to a user voice input and a parameter required for the action in the form of a concept action network (CAN) 231.

The capsule database may store a plurality of capsules (capsule A 230-1 and capsule B 230-4) respectively corresponding to a plurality of domains (e.g., applications). According to an embodiment, one capsule (e.g., capsule A 230-1) may correspond to one domain (e.g., a location or application). Further, one capsule may correspond to at least one service provider (e.g., CP #1 230-2 or CP #2 230-3) for performing a function of a domain related to the capsule. According to an embodiment, one capsule may include at least one action 232 for performing a designated function and at least one concept 233.

The natural language platform 220 may generate a plan for performing a task corresponding to the received voice input through the capsules stored in the capsule database. For example, the planner module 225 of the natural language platform may generate a plan through capsules stored in the capsule database. For example, a plan 234 may be generated using actions 4011 and 4013 and concepts 4012 and 4014 of capsule A 230-1 and an action 4041 and a concept 4042 of capsule B 230-4.

Figure 3:
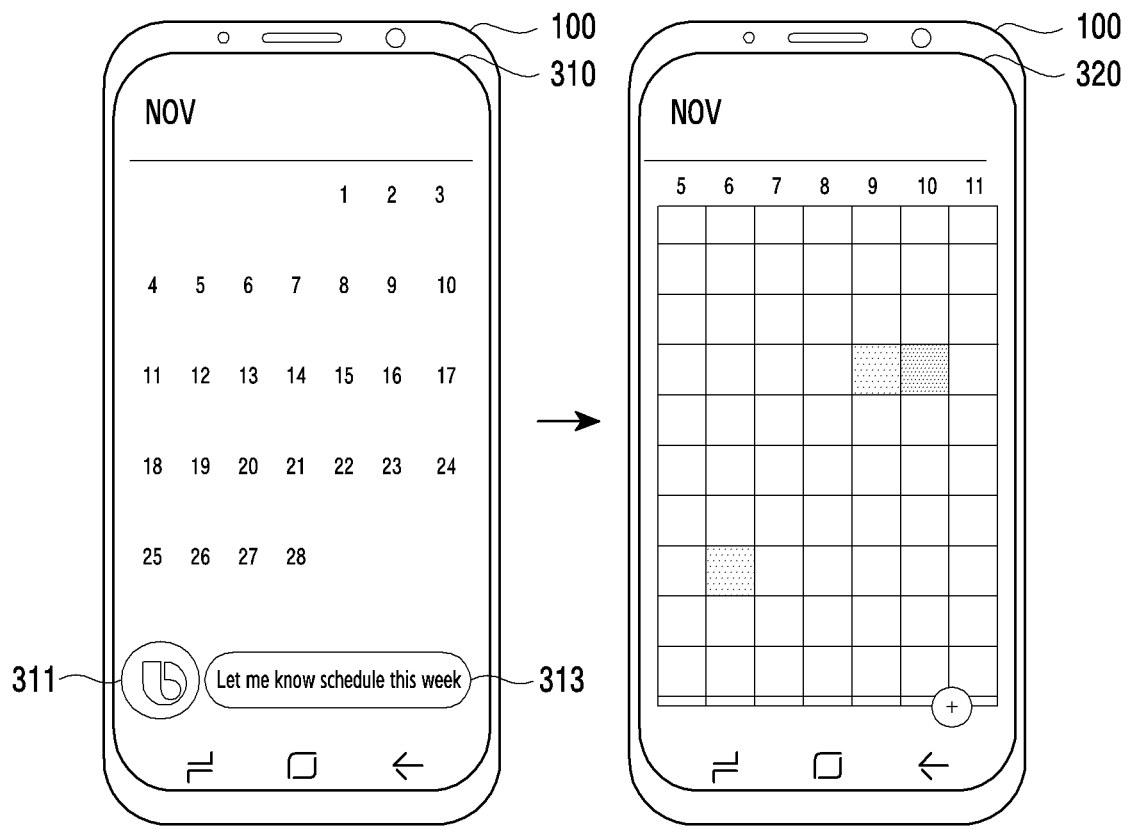
FIG. 3 illustrates a user terminal displaying a screen in which a received voice input is processed through an intelligent app according to an embodiment.

FIG. 3 illustrates a screen in which a user terminal processes a received voice input through an intelligent app according to various embodiments.

The user terminal 100 may execute an intelligent app in order to process a user input through the intelligent server 200.

According to an embodiment, on a screen 310, when recognizing a designated voice input (e.g., wake up!) or receiving an input through a hardware key (e.g., a dedicated hardware key), the user terminal 100 may execute an intelligent app for processing the voice input. The user terminal 100 may execute the intelligent app in a state where, for example, a schedule app is executed. According to an embodiment, the user terminal 100 may display an object 311 (e.g., icon) corresponding to the intelligent app on the display 140. According to an embodiment, the user terminal 100 may receive the voice input by a user utterance. For example, the user terminal 100 may receive the voice input of "Let me know this week's schedule!". According to an embodiment, the user terminal 100 may display, on the display 140, a user interface (UI) 313 (e.g., an input window) of the intelligent app, on which text data of the received voice input is displayed.

According to an embodiment, on a screen 320, the user terminal 100 may display, on the display, a result corresponding to the received voice input. For example, the user terminal 100 may receive a plan corresponding to the received user input, and may display the "This week's schedule" on the display according to the plan.

Figure 4:
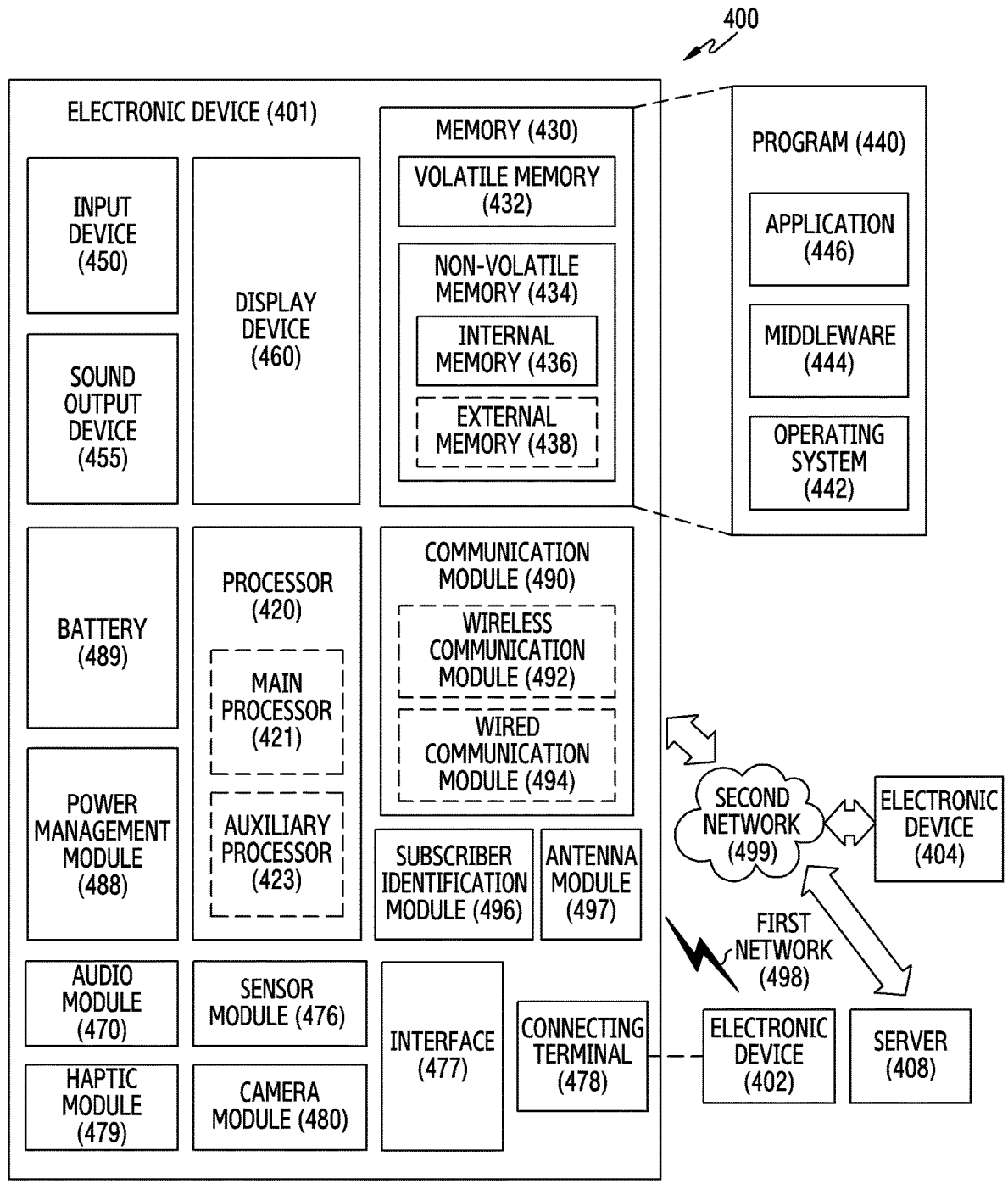
FIG. 4 is a block diagram illustrating an electronic device in a network environment according to various embodiments.

FIG. 4 is a block diagram illustrating an electronic device 401 in a network environment 400 according to various embodiments. In addition, the electronic device of FIG. 4 includes the electronic device 100 of FIG. 1.

Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB). According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, the processor 420 may process a task customized by a user to be executed based on a user utterance. The customized task may be mapped to a command (e.g., a quick command) instructing execution of the task. For example, the customized task may include multiple actions using multiple applications. In addition, the command may include one of a word, a phrase, or a sentence. For example, when detecting a user utterance corresponding to a predetermined command, the processor 420 may process at least one designated task mapped to a command to be executed. For example, when multiple tasks are mapped to a command, the mapped tasks may be sequentially executed or simultaneously executed by the command without a separate subsequent utterance.

According to various embodiments, the processor 420 may output at least one task mapped to a command to a user interface based on a user input (e.g., utterance input, key input, etc.). The output task may include text data. According to an embodiment, the processor 420 may convert an utterance indicating a task into text data and output the same. According to another embodiment, the processor 420 may output at least one task selected from a list of tasks.

According to various embodiments, the processor 420 may guide editing of a selected task. The editing guide may include information leading to change a part of the selected task. The changing of a part of the task may include additionally designating at least one of a time related to the task and a location related to the task. For example, when a task for identifying the current weather is selected, the processor 420 may guide additional designation of location or time information for the selected task so as to execute a task related to the weather in a specific region (e.g., Seoul) and the weather in a specific time zone (e.g., in the morning). However, this is only exemplary, and embodiments of the disclosure are not limited thereto. As an example, the changing of a part of the task may include additionally designating an application for execution of the task. For example, when a task for identifying the current weather by using a first domain (e.g., an application of a first service provider) is selected, the processor 420 may guide such that a task related to a second domain (e.g., application of a second service provider), which provides a function similar or identical to that of the first domain, is designated or executed together. As another example, when a task for identifying the current weather by using the first domain is selected, the processor 420 may guide such that a task using, instead of the first domain, the second domain for providing a function similar or identical to that of the first domain, is designated or executed. As another example, the changing of a part of the task may include additionally designating a control device for execution of the task. For example, when a task for identifying the current weather by using a first electronic device is selected, the processor 420 may guide such that a task using a second electronic device, instead of the first electronic device, is designated or executed.

According to an embodiment, in order to guide editing of a task, the processor 420 may identify a parameter denoting a part of text data, which is replaceable, among selected tasks (e.g., text data). The parameter may correspond to text data including a changeable context. For example, the changeable context may include at least one of time information, location information, and control device information. For example, weather application-related task (e.g., Let me know how the weather is) may undergo a context change to local weather, weekly weather, hourly weather, or the like. Accordingly, the processor 420 may provide, as a parameter, a part of a task (e.g., the word "weather") that may undergo a context change to "local weather", "time-period specific weather", "hourly weather", or the like. As another example, with respect to a task (e.g., "Order a pizza") related to a delivery application, the changeable context is at least one of a menu (e.g., a type of pizza), an order price, an order branch, and a delivery address. Accordingly, the processor 420 may provide, as a parameter, a part of a task in which at least one of a menu, an address, an order price, an order branch, and a delivery address is changeable.

According to an embodiment, the processor 420 may acquire parameter information for a task through an external electronic device (e.g., an electronic device 402 and an electronic device 404), or a server 408 (e.g., the intelligent server 200). For example, the server 408 may analyze text data to determine a domain for processing a task, and may identify at least one action that can be processed in the determined domain, as described later through FIG. 14. In addition, the server 408 may provide parameter information to the electronic device 401 based on at least one identified action. However, this is only exemplary, and embodiments of the disclosure are not limited thereto. As an example, the parameter information may be identified by the electronic device 401. For example, when the electronic device 401 includes a capability corresponding to a natural language platform (e.g., the natural language platform 220 in FIG. 1), the processor 420 may identify parameter information through a natural language understanding module (e.g., the natural language understanding module 223 in FIG. 1) or a planner module (e.g., the planner module 225 of FIG. 1).

According to various embodiments, the processor 420 may display at least one item that is usable instead of (or replaceable with) a parameter, with respect to a selected task (e.g., text data). The at least one item may include, as context information applicable to the selected task, a concept (e.g., input information) for at least one action that can be provided by a domain corresponding to the task. For example, the processor 420 may display, as an item, pre-defined region information of a certain range (e.g., Seoul, Gyeonggi-do, Chungcheong-do, etc.), with respect to a parameter related to a region. In addition, the processor 420 may display, as an item, time information (e.g., morning, afternoon, etc.) of a predefined time interval, with respect to a time-related parameter. For example, at least one item may be determined by the server 408 as described later through FIG. 13. However, this is only exemplary, and embodiments of the disclosure are not limited thereto. For example, when the electronic device 401 has the same or similar processing capability as that of the server 408, at least one item may be determined by the electronic device 401.

According to various embodiments, the processor 420 may change (or replace) a parameter to at least one selected item, with respect to a selected task (e.g., text data). At least one item that is changed from the parameter may be determined based on a key input, a touch input, or a voice input. According to an embodiment, the processor 420 may store a task including at least one item.

According to various embodiments, an electronic device may include a display, a communication interface, at least one processor, and at least one memory. According to an embodiment, the memory is configured to store a task customized by a user, mapped to one of a selected word, phrase, or sentence, and the memory stores instructions which, when executed, cause the processor to: display a user interface configured to set or change the task on the display; display at least one utterance related to the task as text on the user interface; identify and display at least one replaceable parameter in the utterance; receive a user input for selecting or inputting at least one item that is usable as the parameter; and store the task including the item.

According to an embodiment, the user interface may include a first area including the selected word, phrase, or sentence, a second area including the text, and a third area including the at least one item.

According to an embodiment, the user interface may provide a list including the at least one item to a third area.

According to an embodiment, the instructions may cause the processor to select the at least one item at least partially based on information related to a user account.

According to an embodiment, the instructions may cause the processor to select the at least one item based on the type of a domain related to the task.

According to an embodiment, the customized task may include multiple actions using multiple application programs.

According to various embodiments, an intelligent server may include a communication interface, at least one processor, and at least one memory. According to an embodiment, the memory stores instructions which, when executed, cause the processor to: receive at least one utterance related to the task from an electronic device, identify at least one replaceable parameter in the utterance, select at least one item that is usable as the parameter, and transmit the selected at least one item to the electronic device.

According to an embodiment, the instructions may cause the processor to select the at least one item at least partially based on information related to a user account.

According to an embodiment, the instructions may cause the processor to select the at least one item based on the type of a domain related to the task.

According to an embodiment, the instructions may cause the processor to receive a command mapped to the task from an electronic device and select the at least one item based on the received command.

According to an embodiment, the instructions may cause the processor to determine a domain related to the utterance and select the at least one item through a capsule corresponding to the determined domain.

According to an embodiment, the at least one selected item may include a concept of an action provided in a domain related to the task.

According to an embodiment, the at least one item may include at least one of time information, location information, and control device information.

Figure 5:
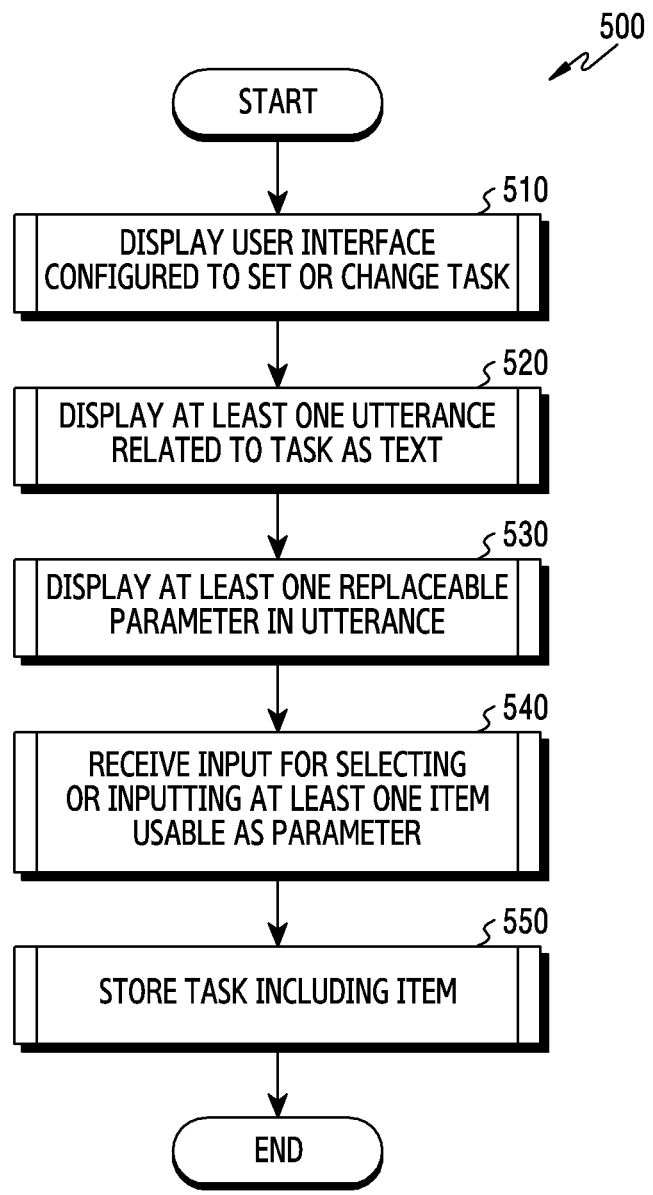
FIG. 5 is a flowchart illustrating editing of a task related to an utterance in an electronic device according to various embodiments.

FIG. 5 is a flowchart 500 illustrating editing of a task related to an utterance in an electronic device according to various embodiments. In the following embodiments, each operation may be sequentially performed, but is not necessarily performed sequentially. For example, the sequence of each operation may be changed, and at least two operations may be performed in parallel. The electronic device of FIG. 5 may be the electronic device 401 of FIG. 4.

Referring to FIG. 5, an electronic device (e.g., the processor 420 of FIG. 4) according to various embodiments may display a user interface configured to set or change a task in operation 510. A user interface configured to set a task may be displayed in response to detecting a task setting event. For example, the task setting event may include a context in which a mode for mapping at least one task to a command (e.g., a quick command) is called. Further, a user interface configured to change a task may be displayed in response to detecting a task change event. For example, the task change event may include a context in which a mode for changing at least one task mapped to a command (e.g., a quick command) is called.

According to an embodiment, a user interface configured to set or change a task may include a first area and a second area. A command mapped to a task may be displayed on the first area. The command is a command designated to execute a task and may include one of a selected word, phrase, or sentence. In addition, in the second area, as described later through operation 520, at least one utterance related to a task may be converted into text and displayed. According to another embodiment, a user interface configured to set or change a task may include a third area. In the third area, as described later through operation 540, at least one item that is replaceable with at least a part of the text data may be displayed. These items may be displayed in a form of a list.

An electronic device (e.g., the processor 420 of FIG. 4) according to various embodiments may display, as text, at least one utterance related to a task in operation 520. According to an embodiment, the processor 420 may operate at least one microphone to receive an utterance. For example, the processor 420 may receive a user utterance while providing information 705 indicating that at least one microphone is operating for utterance reception. In addition, the processor 420 may display the received utterance as text data. According to an embodiment, the processor 420 may receive text data corresponding to the received utterance from an external electronic device (e.g., the electronic device 402 or the electronic device 404), or the server 408 (e.g., the intelligent server 200). In this case, the processor 420 may provide the received utterance to the external electronic device 401, thereby requesting conversion of the received utterance into text data. According to another embodiment, conversion of the received utterance into text data may be performed by an electronic device. For example, when the electronic device includes an automatic speech recognition module, the processor 420 may change the received utterance into text data by using the automatic speech recognition module. According to an embodiment, the processor 420 may process text data, obtained by conversion of at least one utterance related to a task, to be displayed on a second area of a user interface configured to set or change the task.

An electronic device (e.g., the processor 420 of FIG. 4) according to various embodiments may display at least one replaceable parameter in the utterance, in operation 530. The parameter may correspond to text data, which includes a changeable context, among text data. According to an embodiment, the changeable context may include at least one of time information, location information, and control device information. According to an embodiment, the processor 420 may output at least one of an output color and an output size for a parameter to be identified from other text data. According to another embodiment, the processor 420 may assign a designated graphic object (e.g., an icon, etc.) to a parameter so that the parameter is identified from other text data.

An electronic device (e.g., the processor 420 of FIG. 4) according to various embodiments may receive a user input for selecting or inputting at least one item that is usable as a parameter, in operation 540. The at least one item is information related to a setting or changed task that may undergo a context change, and may include a concept (e.g., input information) for at least one action that may be provided by a domain corresponding to the task. For example, at least one item may be output in a list format. For example, at least one item may be displayed on a third area of a user interface configured to set or change a task. In addition, when there are multiple parameters, the processor 420 may output a list of items respectively corresponding to parameters. According to an embodiment, the processor 420 may select or receive an input of at least one item that is usable as a parameter, based on a key input, a touch input, or a voice input.

An electronic device (e.g., the processor 420 of FIG. 4) according to various embodiments may store a task including a selected item in operation 550. According to an embodiment, the processor 420 may store text data including a parameter replaced by a selected item. However, this is only exemplary, and embodiments of the disclosure are not limited thereto. For example, the processor 420 may store a task including both of a parameter and a selected item.

Figure 6:
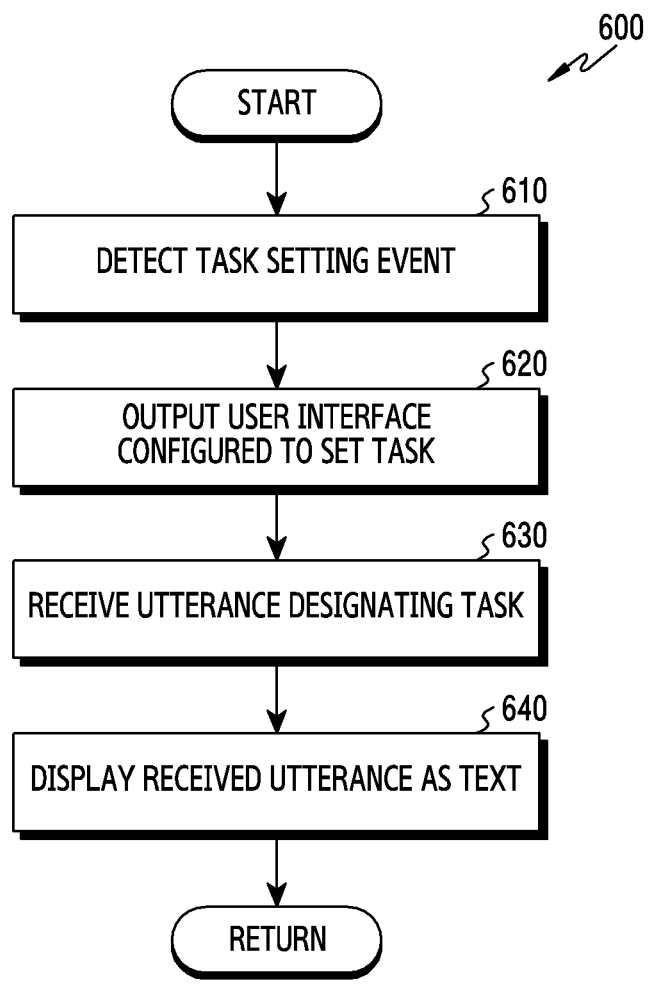
FIG. 6 is a flowchart illustrating processing of a task setting event in an electronic device according to various embodiments.
Figure 7A:
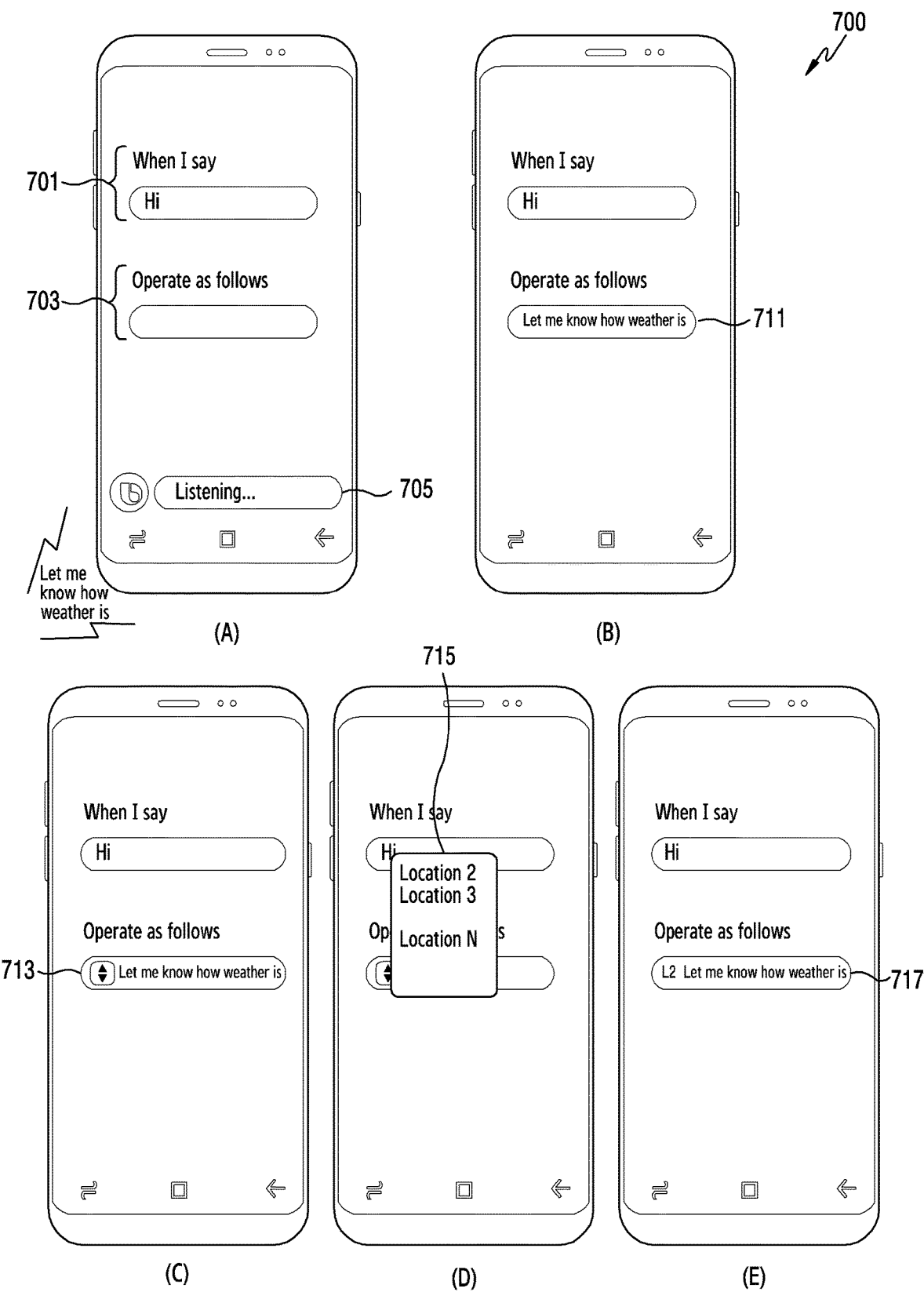
FIGS. 7A to 7C illustrate a task setting event according to various embodiments.
Figure 7B:
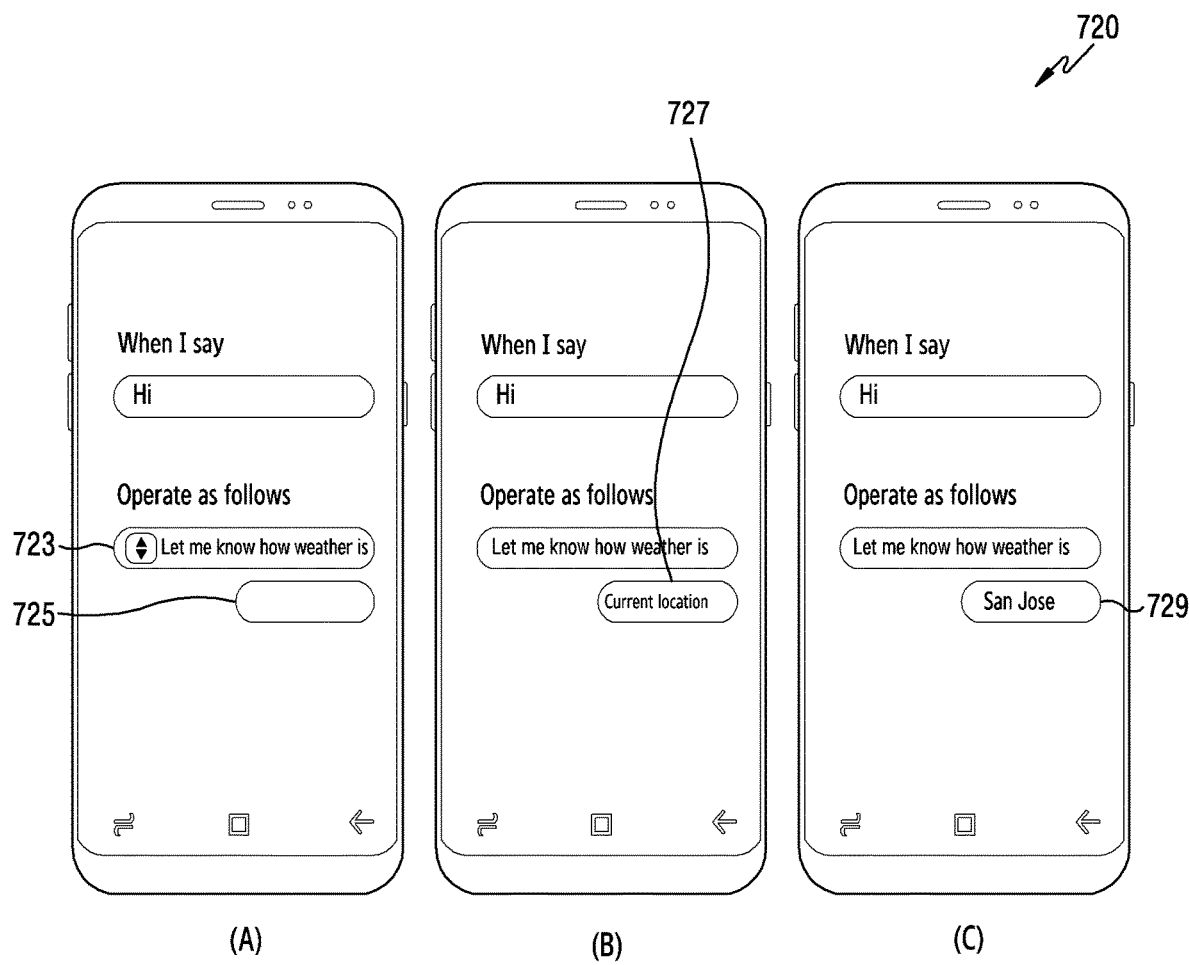
Figure 7C:
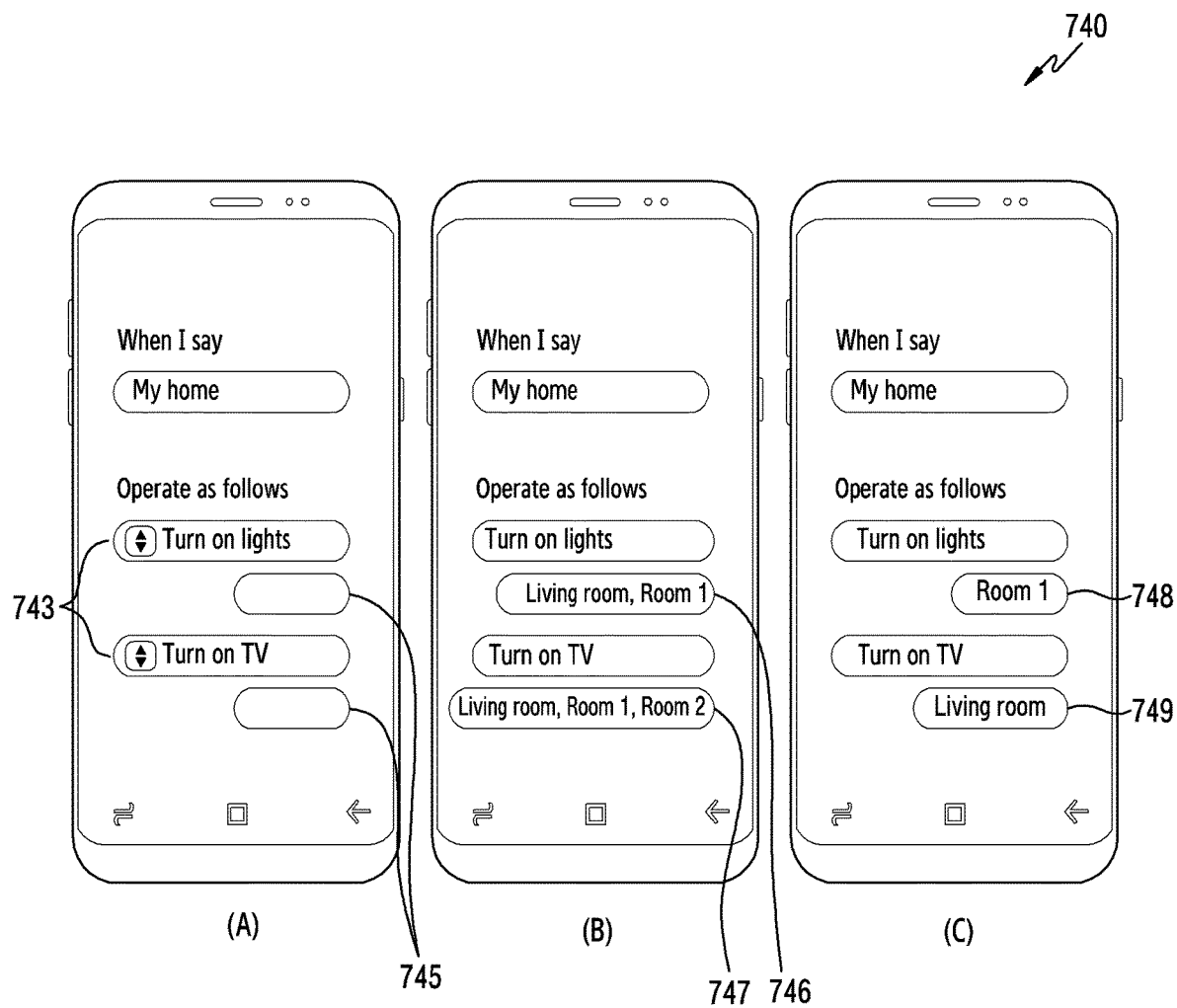

FIG. 6 is a flowchart 600 illustrating processing of a task setting event in an electronic device according to various embodiments. FIGS. 7A to 7C are diagrams 700, 720, and 740 for explaining a task setting event according to various embodiments. The operations of FIG. 6 to be described below represent various embodiments of operations 510 and 520 of FIG. 5. In the following embodiments, each operation may be sequentially performed, but is not necessarily performed sequentially. For example, the sequence of each operation may be changed, and at least two operations may be performed in parallel. The electronic device of FIG. 6 may be the electronic device 401 of FIG. 4.

Referring to FIG. 6, an electronic device (e.g., the processor 420 of FIG. 4) according to various embodiments may detect a task setting event in operation 610. As described above with reference to FIG. 5, the task setting event may include a context in which a mode for mapping at least one task to a command (e.g., a quick command) is called.

An electronic device (e.g., the processor 420 of FIG. 4) according to various embodiments may output a user interface configured to set a task in response to detecting a task setting event, in operation 620. The user interface configured to set the task may include a first area 701, a second area 703, and a third area 715, as shown in (a) and (d) of FIG. 7A. As described above with reference to FIG. 5, a command mapped to a task (e.g., Hi) may be displayed on the first area 701, at least one utterance related to the task may be converted into text data and displayed on the second area 703, and at least one item that is replaceable with at least a part of text data or is addable to text data may be displayed on the third area 715.

An electronic device (e.g., the processor 420 of FIG. 4) according to various embodiments may receive an utterance designating a task in operation 630. According to an embodiment, the processor 420 may operate at least one microphone to receive speech. For example, as shown in (a) of FIG. 7A, the processor 420 may receive a user utterance (e.g., Let me know how the weather is) while providing information 705 indicating that at least one microphone is operating for utterance reception.

An electronic device (e.g., the processor 420 of FIG. 4) according to various embodiments may convert the received utterance into text data and display the same, in operation 640. For example, as shown in (b) of FIG. 7, the received utterance may be converted into text and displayed on the second area 703 (indicated by reference numeral 711). According to an embodiment, as described above with reference to FIG. 5, the received utterance may be converted into text data by an electronic device or an external electronic device (e.g., the electronic device 402 or the electronic device 404).

An electronic device (e.g., the processor 420 of FIG. 4) according to various embodiments may display the received utterance as text data and then the operation thereof returns to FIG. 5.

According to an embodiment, the processor 430 may display at least one replaceable parameter in the utterance, as described above through operation 530 of FIG. 5. For example, the word "weather" among displayed text data may undergo a context change to local weather, weekly weather, hourly weather, or the like. Accordingly, as shown in (c) of FIG. 7A, the processor 420 may display (indicated by reference numeral 713), as a parameter, a part of a task (e.g., word "weather") that may undergo a context change to "local weather", "time-period specific weather", "hourly weather", or the like.

In addition, the processor 420 may display at least one item that is usable as a parameter, as described above through operation 540 of FIG. 5. For example, as shown in (d) of FIG. 7A, the processor 420 may display, as an item, at least one area information that may serve as a reference for weather information (indicated by reference numeral 715). In addition, although not shown, the processor 420 may display, as an item, at least one piece of time information (e.g., morning, afternoon, etc.) that may serve as a reference for weather information. In addition, the processor 420 may receive a user input for selecting at least one displayed item.

In addition, the processor 420 may store a task including the selected item, as described above through operation 550 of FIG. 5. For example, as shown in (e) of FIG. 7A, the processor 420 may store a task (e.g., Let me know how L2's weather is) including an item (e.g., location 2, L2) selected by input. Accordingly, when receiving a command (e.g., Hi) instructing execution of the task, the processor 420 may execute a task of providing weather for location 2.

According to another embodiment, the processor 420 may determine at least one item that is usable as a parameter based on a user input. For example, as shown in (a) of FIG. 7B, after displaying at least one parameter 723 that is replaceable in the utterance, the processor may display an input area 725 to which at least one item to be replaced with the parameter is input. In addition, as shown in (b) and (c) of FIG. 7B, the processor 420 may display items (e.g., current location 727 and San Jose 729), which are input through additional utterance input or key input, on the input area 725. Accordingly, as shown in (b) of FIG. 7B, when receiving a command (e.g., Hi) instructing execution of a task in a state where the task is designated, the processor 420 may execute a task for providing time information based on the current location of the electronic device. In addition, as shown in (c) of FIG. 7B, when receiving a command (e.g., Hi) instructing execution of a task in a state where the task is designated, the processor 420 may execute a task for providing time information of the San Jose region. As another example, the processor 420 may determine an item that is replaceable with a parameter, based on location information of the electronic device. For example, when the electronic device is located in the San Jose area of the United States, the processor 420 may determine San Jose as an item and display the same on the input area without additional utterance input or key input.

According to another embodiment, the processor 420 may determine at least one item that is usable as a parameter based on a communication state. For example, as shown in (a) of FIG. 7C, after displaying at least one parameter 743 that is replaceable in the utterance, the processor may display an input area 745 to which at least one item to be replaced with a parameter is input. Here, the processor 420 may use, as an item, information on a control device, which is connected with the electronic device through communication, and display the information on the input area 745. For example, if the electronic device is capable of communicating with the lighting arranged in the living room and room 1, as shown in (b) of FIG. 7C, the processor 420 may display "Living Room" and "Room 1", as items for a parameter of a task "Turn on the lights" (indicated by reference numeral 746). In addition, when the electronic device is capable of communicating with TVs arranged in the living room, room 1, and room 2, as shown in (b) of FIG. 7C, the processor 420 may display "Living Room", "Room 1", and "Room 2" as items for a parameter of a task "Turn on the TV" (indicated by reference numeral 747).

According to another embodiment, the processor 420 may determine at least one item that is usable as a parameter based on a control history. The control history may be related to registration information of a control device for a user account. According to an embodiment, the processor 420 may select, as an item, information on at least one control device registered in an account of a user using an electronic device. For example, as shown in (a) of FIG. 7C, after displaying at least one parameter 743 that can be replaced in the utterance, the processor may display an input area 745 to which the parameter and at least one item to be replaced are input. Here, the processor 420 may display information on the control device having a history of being controlled through the electronic device as an item on the input area 745. For example, if the electronic device has a history of controlling the lighting placed in room 1 among the lighting placed in the living room and room 1, as shown in (c) of FIG. 7c, the processor 420 may display "Room 1", as an item for the parameter of the task "Turn on the lights" (indicated by reference numeral 748). In addition, if the electronic device has a history of controlling a TV placed in the living room among TVs placed in the living room, room 1, and room 2, as shown in (c) of FIG. 7C, the processor 420 may display the "living room" as an item for the parameter of the task "Turn on the TV" (indicated by reference numeral 749).

Figure 8:
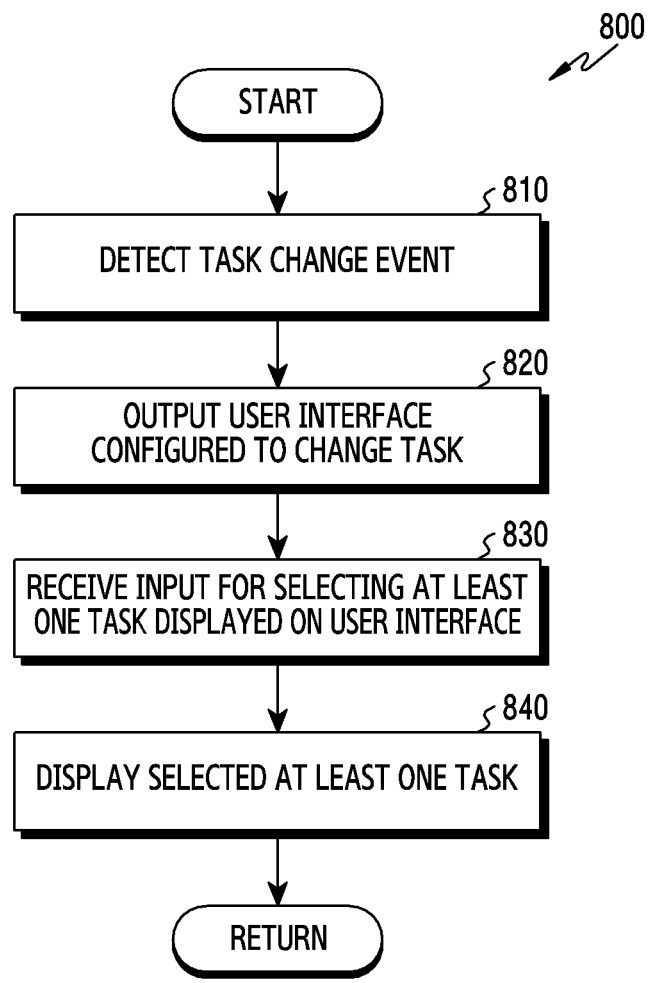
FIG. 8 is a flowchart illustrating processing of a task change event in an electronic device according to various embodiments.
Figure 9:
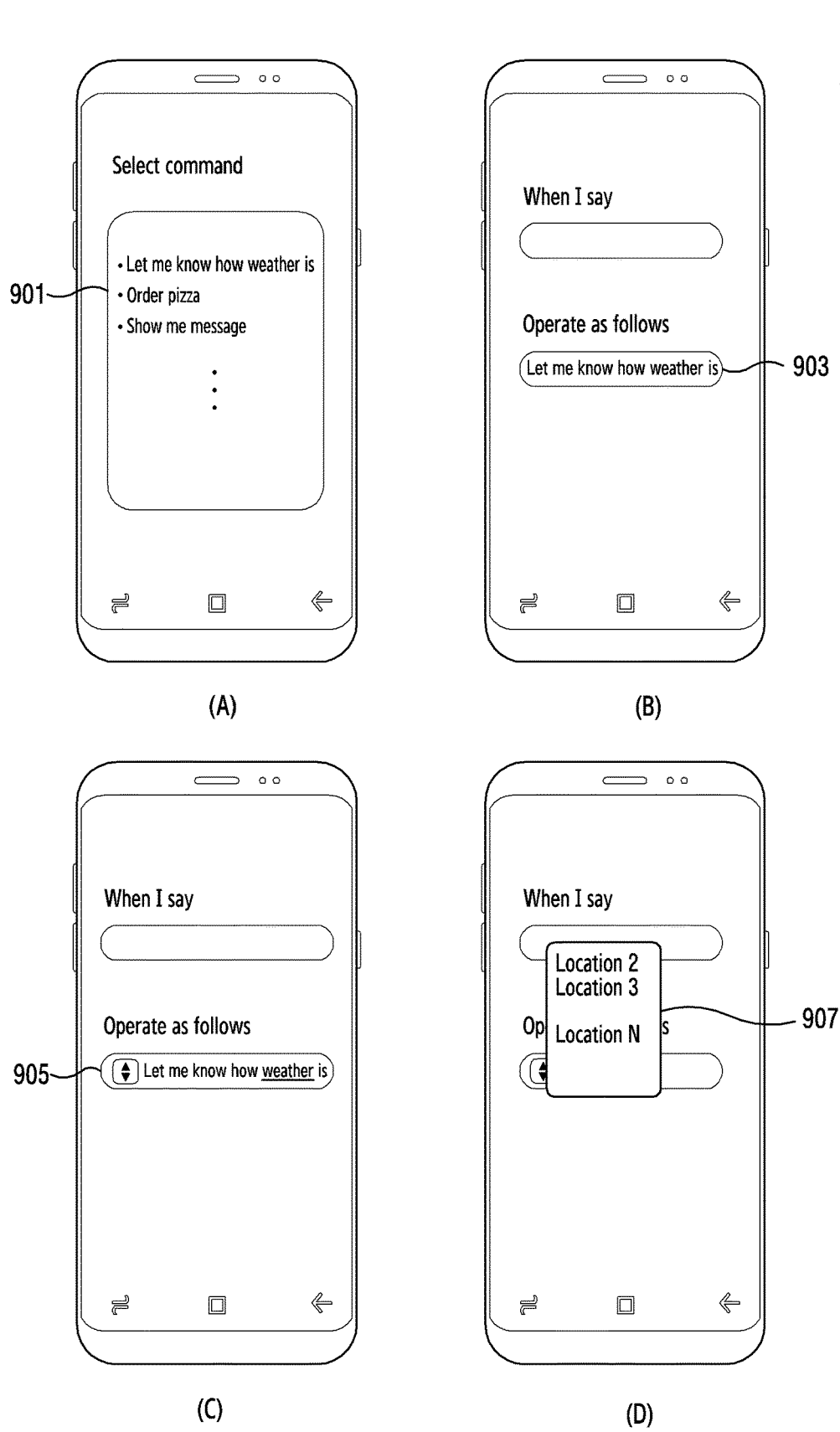
FIG. 9 illustrates a task change event according to various embodiments.

FIG. 8 is a flowchart 800 illustrating processing of a task change event in an electronic device according to various embodiments. FIG. 9 is a diagram 900 for explaining a task change event according to various embodiments. The operations of FIG. 8 to be described below represent various embodiments of operations 510 and 520 of FIG. 5. In the following embodiments, each operation may be sequentially performed, but is not necessarily performed sequentially. For example, the sequence of each operation may be changed, and at least two operations may be performed in parallel. The electronic device of FIG. 8 may be the electronic device 401 of FIG. 4.

Referring to FIG. 8, an electronic device (e.g., the processor 420 of FIG. 4) according to various embodiments may detect a task change event in operation 810. As described above with reference to FIG. 5, the task change event may include a context in which a mode for changing at least one task mapped to a command (e.g., a quick command) is called.

An electronic device (e.g., the processor 420 of FIG. 4) according to various embodiments may output a user interface configured to change a task in response to detecting a task change event in operation 820. The user interface configured to change the task may display a list 901 of tasks designated by a user or executed by an electronic device in a text form, as shown in FIG. 9A.

An electronic device (e.g., the processor 420 of FIG. 4) according to various embodiments may receive an input for selecting at least one task from among a list displayed on a user interface, in operation 830. The input for selecting a task may include at least one of an utterance input, a key input, and a touch input.

An electronic device (e.g., the processor 420 of FIG. 4) according to various embodiments may display at least one task selected based on an input in operation 840. According to various embodiments, a user interface configured to change a task may also include a first area, a second area, and a third area. According to an embodiment, as illustrated in FIG. 9B, the selected at least one task may be displayed in a text data format on a second area 903 of the user interface.

An electronic device (e.g., the processor 420 of FIG. 4) according to various embodiments may display the selected task and the operation thereof returns to FIG. 5.

According to an embodiment, referring to (c) of FIG. 9, the processor 430 may display at least one replaceable parameter among text data of the selected task (indicated by reference numeral 905), as described above through operation 530 of FIG. 5.

In addition, referring to FIG. 9D, the processor 420 may display at least one item that is usable as a parameter (indicated by reference numeral 907), as described above through operation 540 of FIG. 5.

In addition, referring to FIG. 9, the processor 420 may store a task including the selected item, as described above through operation 550 of FIG. 5.

Figure 10:
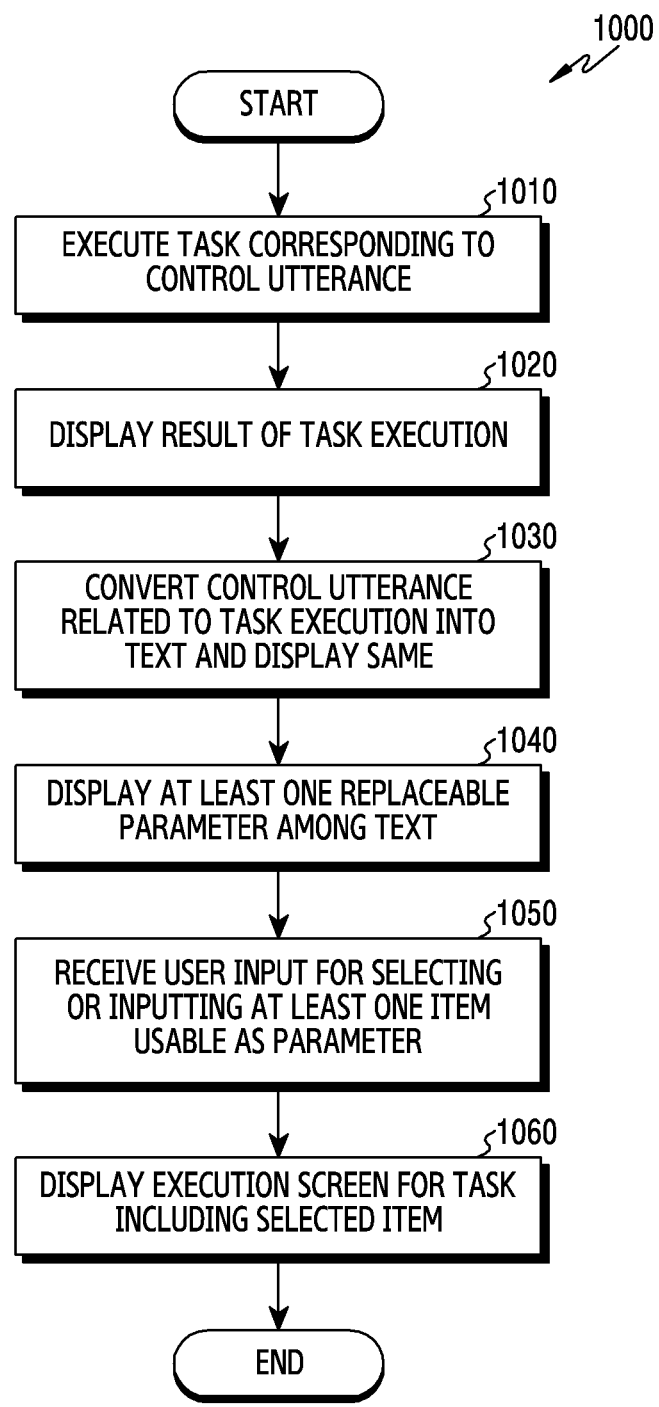
FIG. 10 is a flowchart illustrating processing of a control utterance in an electronic device according to various embodiments.
Figure 11:
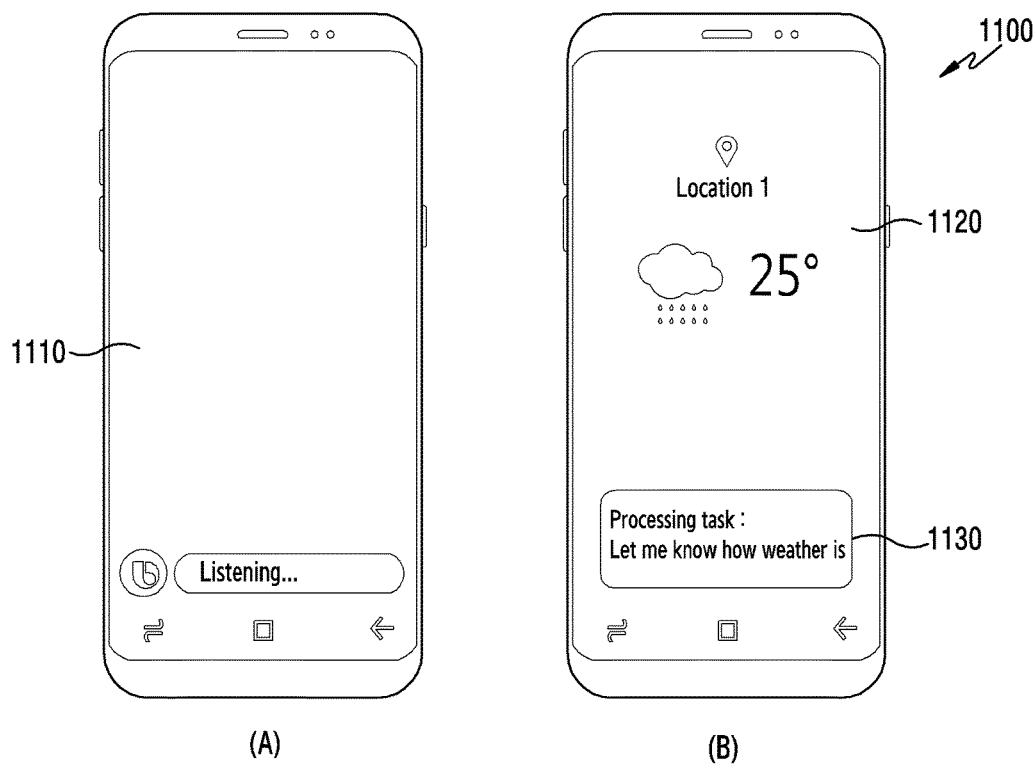
FIG. 11 illustrates a context in which a control utterance is processed according to various embodiments.
Figure 11:
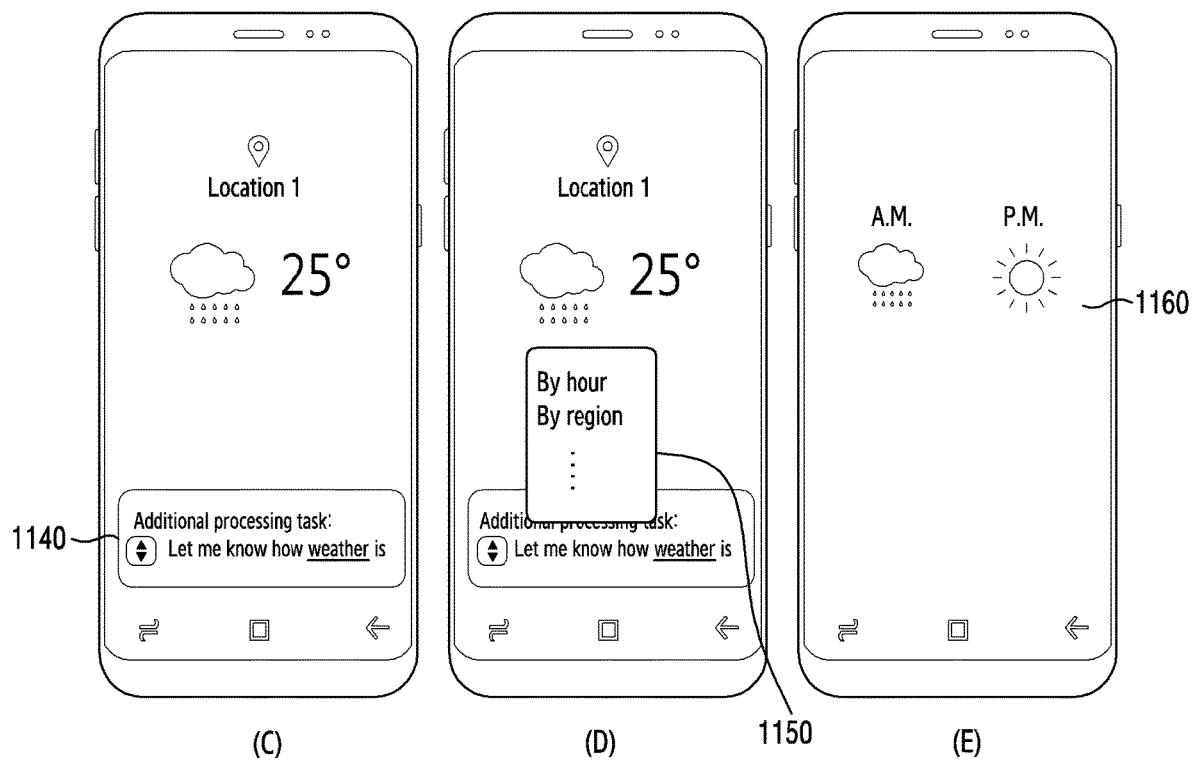

FIG. 10 is a flowchart 1000 illustrating processing of a control utterance in an electronic device according to various embodiments. FIG. 11 is a diagram 1100 for explaining a context in which a control utterance is processed according to various embodiments. In the following embodiments, each operation may be sequentially performed, but is not necessarily performed sequentially. For example, the sequence of each operation may be changed, and at least two operations may be performed in parallel. The electronic device of FIG. 10 may be the electronic device 401 of FIG. 4.

Referring to FIG. 10, an electronic device (e.g., the processor 420 of FIG. 4) according to various embodiments may execute a task corresponding to a control utterance in operation 1010. The control utterance may be an utterance instructing the operation (e.g., power control and volume control) of a hardware/software configuration included in an electronic device or control device (e.g., a computer, a television, a lighting device, a refrigerator, an air conditioner, a thermostat, a security device, a gas valve control device, a door lock device, etc.). For example, the control utterance may be obtained in a state in which an intelligent assistance service is activated or called by a wake-up utterance. For example, as shown in (a) of FIG. 11, the processor 420 may receive a control utterance (e.g., Let me know how the weather is) in a state (indicated by reference numeral 1110) where at least one microphone is operated to receive an utterance.

An electronic device (e.g., the processor 420 of FIG. 4) according to various embodiments may display a result of task execution in operation 1020. For example, the processor 420 may display the result of task execution (e.g., weather corresponding to the current location) based on context information (e.g., the current location of the electronic device 401) of the electronic device 401.

An electronic device (e.g., the processor 420 of FIG. 4) according to various embodiments may convert a control utterance instructing execution of a task into text data and display the same in operation 1030. According to an embodiment, the processor 420 may convert the control utterance into text data through the electronic device 401, an external electronic device (e.g., the electronic device 402 or the electronic device 404), or the server 408 (e.g., the intelligent server 200), as described above with reference to FIG. 5. For example, the processor 420 may perform processing such that the control utterance recognized by the electronic device 401 is converted into text data and is displayed on at least a part of the execution result 1120, as shown in FIG. 11B (indicated by reference numeral 1130).

An electronic device (e.g., the processor 420 of FIG. 4) according to various embodiments may display at least one replaceable parameter among displayed text data in operation 1040. The parameter may correspond to at least a part of text data including a changeable context among text data, as described above with reference to FIG. 5. For example, as shown in (c) of FIG. 11, the processor 420 may assign a designated graphic object (e.g., an underline) to the parameter to be identified from other text data (indicated by reference numeral 1140).

An electronic device (e.g., the processor 420 of FIG. 4) according to various embodiments may receive a user input for selecting or inputting at least one item that is usable as a parameter in operation 1050. As described above with reference to FIG. 5, the at least one item may be information related to the executed task that may undergo a context change. For example, as shown in (d) of FIG. 11, the processor 420 may display items such as hourly weather and regional weather (indicated by reference numeral 1150).

An electronic device (e.g., the processor 420 of FIG. 4) according to various embodiments may display an execution screen for a task including the selected item in operation 1050. For example, as shown in (e) of FIG. 11, the processor 420 may display an execution screen 1160 for providing hourly weather information in response to selection of an item corresponding to hourly weather.

Figure 12:
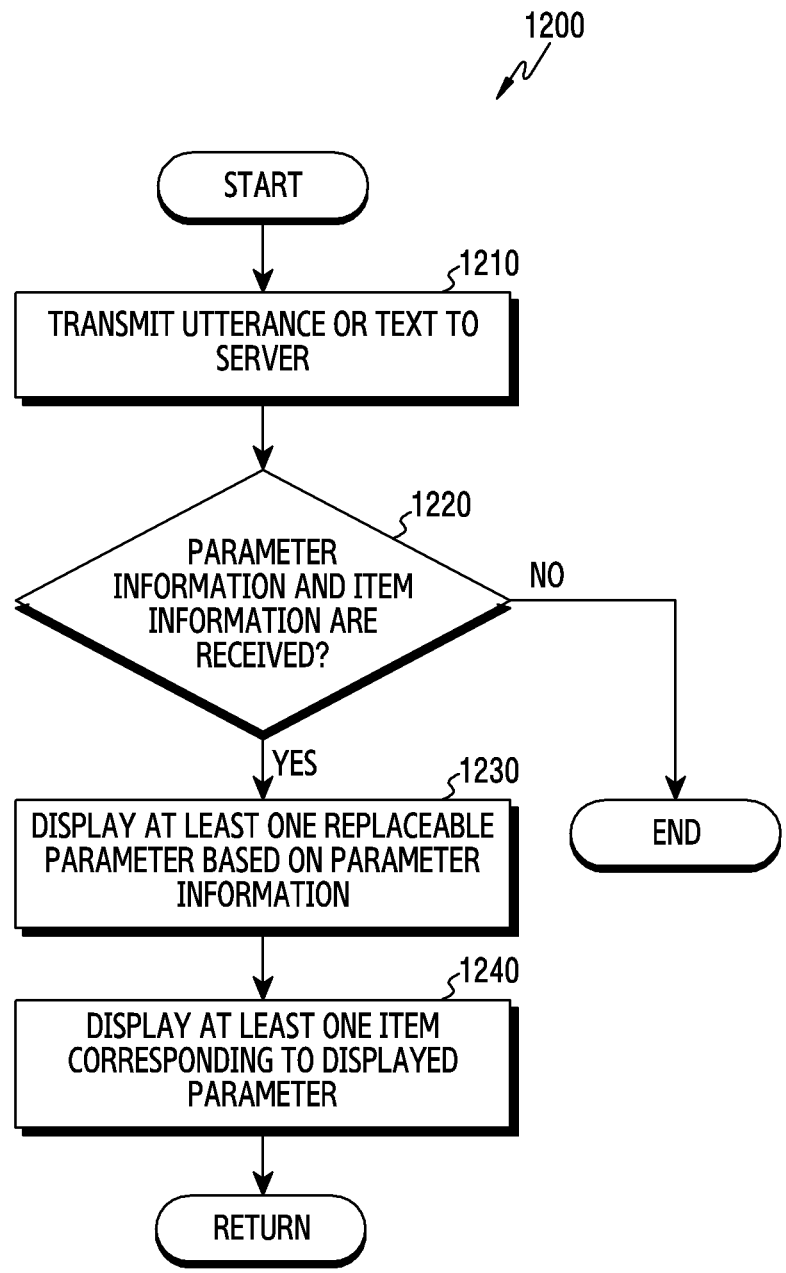
FIG. 12 is a flowchart illustrating editing of a task in an electronic device according to various embodiments.

FIG. 12 is a flowchart 1200 illustrating editing of a task in an electronic device according to various embodiments. The operations of FIG. 12 to be described below represent various embodiments of operations 530 and 540 of FIG. 5. In the following embodiments, each operation may be sequentially performed, but is not necessarily performed sequentially. For example, the sequence of each operation may be changed, and at least two operations may be performed in parallel. The electronic device of FIG. 12 may be the electronic device 401 of FIG. 4.

Referring to FIG. 12, an electronic device (e.g., the processor 420 of FIG. 4) according to various embodiments may transmit an utterance or text data obtained by conversion of the utterance to a server (e.g., the intelligent server 200 of FIG. 1) in operation 1210. The utterance may be an utterance for designating a task mapped to a command.

An electronic device (e.g., the processor 420 of FIG. 4) according to various embodiments may determine whether to receive parameter information and item information in response to transmission of the utterance or text data obtained by conversion of the utterance in operation 1220. The parameter information may be used to determine a parameter in an utterance which is converted to text. According to an embodiment, the parameter information may be related to a context applicable to an action that may be provided through a domain (e.g., an application) related to a task. In addition, the item information may be information that is replaceable with at least one replaceable parameter in an utterance displayed as text. For example, the item information is context information applicable to the selected task and may include a concept (e.g., input information) for at least one action that can be provided by a domain corresponding to the task.

When parameter information and item information are not received, an electronic device (e.g., the processor 420 of FIG. 4) according to various embodiments may terminate an operation of editing a task in conjunction with the server. However, this is only exemplary, and embodiments of the disclosure are not limited thereto. For example, when the electronic device 401 has the same or similar processing power as that of the server 408, the processor 420 may acquire parameter information and item information by itself. The parameter information and item information may be acquired by an electronic device in a similar manner to the operation of a server (e.g., the intelligent server 200) described later through FIGS. 14 to 17.

When the parameter information and item information are received, an electronic device (e.g., the processor 420 of FIG. 4) according to various embodiments may display at least one replaceable parameter in a task displayed as text, based on the parameter information in operation 1230. According to an embodiment, the processor 420 may receive parameter information related to a location, a time, a date, etc. in response to transmission of an utterance or text data of "Let me know how the weather is". In this case, the processor 401 may indicate that a context related to at least one of a location, a time, and a period is additionally applicable by displaying a parameter on at least a part (e.g., the word "weather") of the utterance displayed as text.

An electronic device (e.g., the processor 420 of FIG. 4) according to various embodiments may display at least one item corresponding to the displayed parameter in operation 1240. According to an embodiment, the processor 420 may display at least one item that is replaceable with a parameter. For example, the processor 420 may display 715 an item indicating at least one selectable region, as shown in (d) of FIG. 7A. For example, the at least one item may be displayed on a third area of a user interface configured to set a task and/or a user interface configured to change a task.

Figure 13:
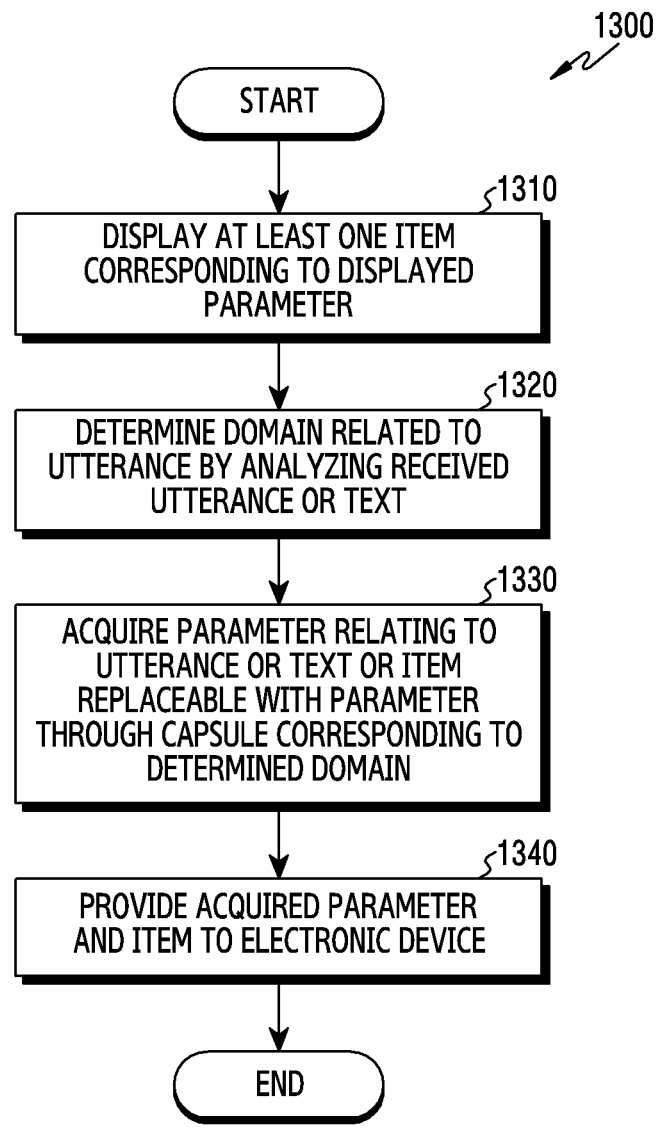
FIG. 13 is a flowchart illustrating a procedure of guiding editing of a task in a server according to various embodiments.

FIG. 13 is a flowchart 1300 illustrating a procedure of guiding editing of a task in a server according to various embodiments. In the following embodiments, each operation may be sequentially performed, but is not necessarily performed sequentially. For example, the sequence of each operation may be changed, and at least two operations may be performed in parallel. The server of FIG. 13 may be the intelligent server 200 of FIG. 1.

Referring to FIG. 13, a server (e.g., the natural language platform 220 of FIG. 1) according to various embodiments may receive at least one utterance related to a task or text corresponding to the utterance in operation 1310. At least one utterance related to the task or text corresponding to the utterance may be received through the electronic device 401.

A server (e.g., the natural language platform 220 of FIG. 1) according to various embodiments may analyze the received utterance or text to determine a domain related to the utterance in operation 1320. According to an embodiment, the natural language platform 220 may recognize a user's intention by analyzing the received utterance or text, and may determine a domain necessary for performing a task based on the recognized intention.

A server (e.g., the natural language platform 220 of FIG. 1) according to various embodiments may acquire, through a capsule corresponding to the determined domain, at least one replaceable parameter for an utterance or text and at least one item corresponding to the corresponding parameter in operation 1330. According to an embodiment, the natural language platform 220 may identify at least one action corresponding to the user's intention through a capsule corresponding to the determined domain. In addition, the natural language platform 220 may acquire a parameter related to a context applicable to at least one identified action and an item indicating a concept for the action.

A server (e.g., the natural language platform 220 of FIG. 1) according to various embodiments may provide at least one acquired parameter and an item corresponding to the at least one parameter to the electronic device 401 in operation 1340.

Figure 14:
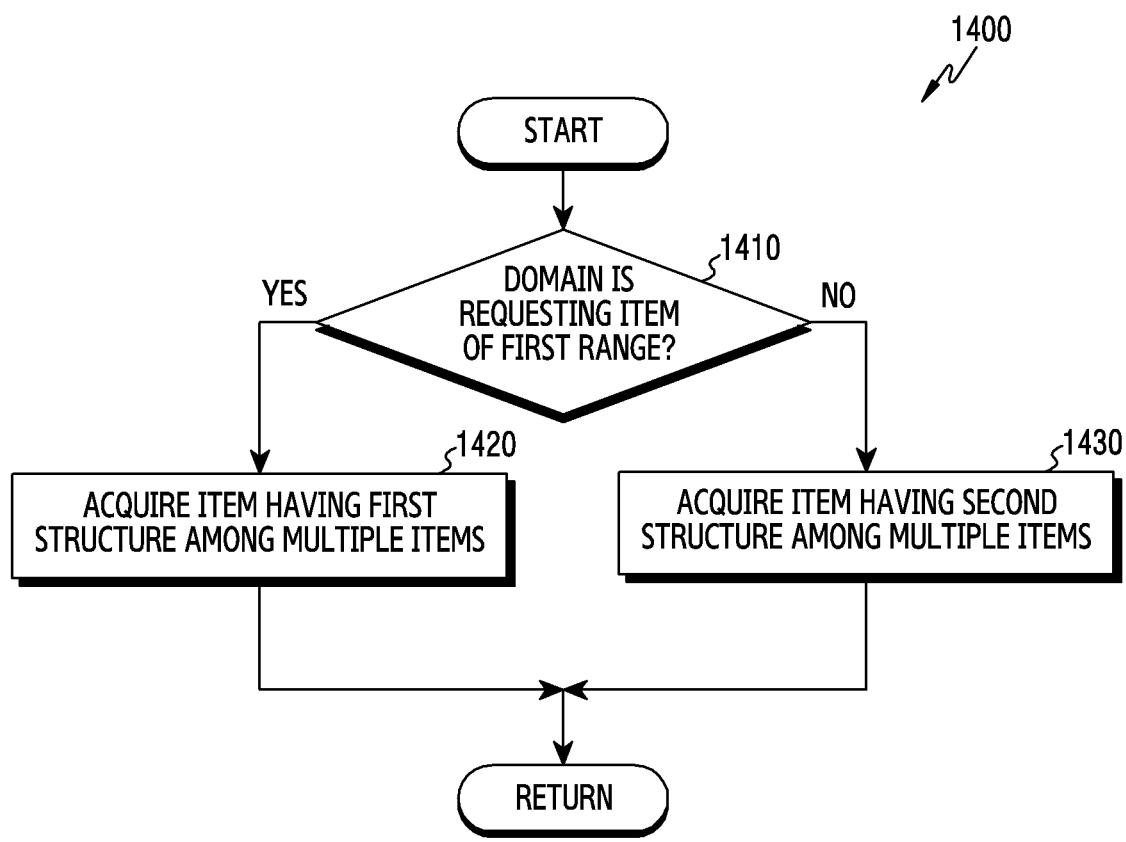
FIG. 14 is a flowchart illustrating a procedure of acquiring an item from a server according to various embodiments.

FIG. 14 is a flowchart 1400 illustrating a procedure of acquiring at least one item from a server according to various embodiments. The operations of FIG. 14 to be described below represent various embodiments of operations 1320 to 1330 of FIG. 13. In the following embodiments, each operation may be sequentially performed, but is not necessarily performed sequentially. For example, the sequence of each operation may be changed, and at least two operations may be performed in parallel. The server of FIG. 14 may be the intelligent server 200 of FIG. 1.

Referring to FIG. 14, in operation 1410, a server (e.g., the natural language platform 220 of FIG. 1) according to various embodiments may determine whether a domain related to an utterance is a type of requesting an item of a first range or a type of requesting an item of a second range. The items of the first range may include items of a first structure (e.g., a single structure), as shown in <Table 1> below. According to an embodiment, a domain requesting the items of the first range may be a domain (e.g., a weather application) that provides a service (e.g., weather by region) based on higher administrative divisions (e.g., special cities, metropolitan cities, provinces, etc.).

TABLE 1

| Number | Item |
|---|---|
| 1 | Seoul |
| 2 | Gyeongi-do |
| 3 | Chungcheong-do |
| 4 | Gangwon-do |
| ... | ... |

In addition, the items of the second range may include items of the second structure (e.g., a hierarchical structure) as shown in <Table 2> below. According to an embodiment, a domain requesting items of the second range is a domain (e.g., a delivery application) that provides a service (e.g., a delivery address) based on lower administrative divisions (e.g., districts (gu), neighborhoods (dong), towns (eup), townships (myeon), road, etc.).

TABLE 2

| City | Gu | Road | Detail divisions |
|---|---|---|---|
| Seoul special city | Gangnam-gu | Gangnam-daero | 42-gil |
| | | | 44-gil |
| | | | 46-gil |
| | | | 48-gil |
| | | Gaepo-ro | 15-gil |
| | | | 17-gil |
| | | | 19-gil |

According to an embodiment, when it is determined that the domain is a type of requesting an item of the first range, the server (e.g., the natural language platform 220 of FIG. 1) may acquire or select an item having a first structure among multiple items in operation 1420.

According to an embodiment, when it is determined that the domain is a type of requesting an item of the second range, the server (e.g., the natural language platform 220 of FIG. 1) may acquire or select an item having a second structure among multiple items in operation 1430.

According to various embodiments, the server may acquire or select an item having the first structure or the second structure, and then the operation thereof returns to FIG. 13. According to an embodiment, the server may perform an operation similar to or the same as operation 1340 of providing information on the acquired or selected item to an electronic device. Accordingly, the electronic device may select at least one item that is usable as a parameter based on the received information.

Figure 15:
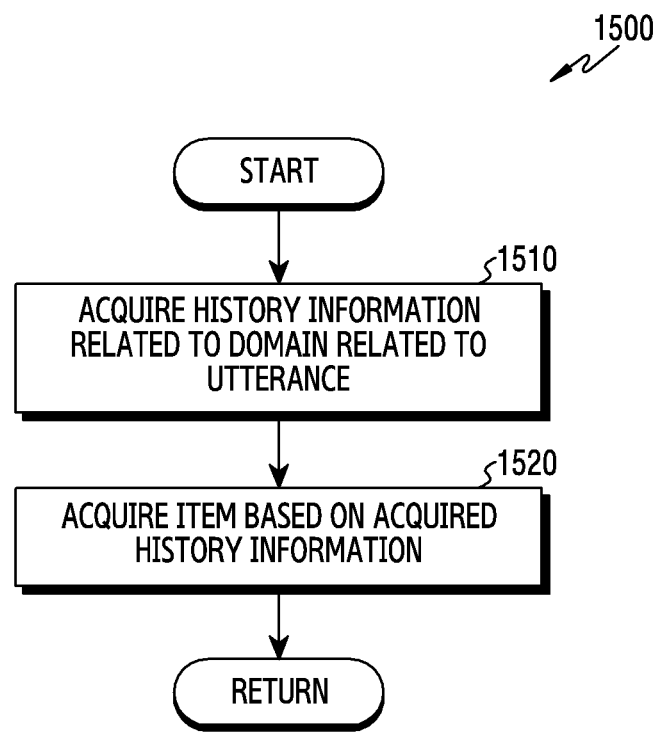
FIG. 15 is a flowchart illustrating another procedure of acquiring an item from a server according to various embodiments.

FIG. 15 is a flowchart 1500 illustrating another procedure of acquiring an item from a server according to various embodiments. The operations of FIG. 1 to be described below represent various embodiments of operation 1330 of FIG. 13. In the following embodiments, each operation may be sequentially performed, but is not necessarily performed sequentially. For example, the sequence of each operation may be changed, and at least two operations may be performed in parallel. The server of FIG. 15 may be the intelligent server 200 of FIG. 1.

Referring to FIG. 15, a server (e.g., the natural language platform 220 of FIG. 1) according to various embodiments may acquire history information corresponding to a domain related to an utterance in operation 1510. According to an embodiment, the history information may include information on a device controlled through a domain. For example, as shown in <Table 3> below, the natural language platform 220 may store information on a device controlled for each domain.

TABLE 3

| Domain | Control device |
|---|---|
| A | Lighting |
| B | Gas range |
| C | Speaker |

According to another embodiment, the history information may be related to registration information of a control device for a user account. For example, as shown in <Table 4> below, the natural language platform 220 may classify control devices, registered with the same account, according to each device type and store the same.

TABLE 4

| User account | Device type | Device model name | Device location |
|---|---|---|---|
| Tom@samsung.net | TV | STN-D7000 | Living room |
| | | STN-E8300 | room 1 |
| | BT speaker | SP-E2400 | Living room |
| | Light | E100 | Dining room |

A server (e.g., the natural language platform 220 of FIG. 1) according to various embodiments may acquire or select an item based on the acquired history information in operation 1520. According to an embodiment, the natural language platform 220 may select a control device that has been controlled a reference number of times or more, from among control devices controlled by a domain related to an utterance, and may provide the selected control device as an item. According to another embodiment, the natural language platform 220 may select a control device that has been controlled the reference number of times or more, from among control devices registered in a user account, and may provide the selected control device as an item. According to another embodiment, the natural language platform 220 may select a control device that has established communication with an electronic device, and may provide the selected control device as an item.

According to various embodiments, the server may acquire or select an item based on the history information and then the operation thereof returns to FIG. 13. According to an embodiment, the server may perform an operation similar to or the same as operation 1340 of providing information on the acquired or selected item to an electronic device. Accordingly, the electronic device may select at least one item that is usable as a parameter based on the received information.

Figure 16:
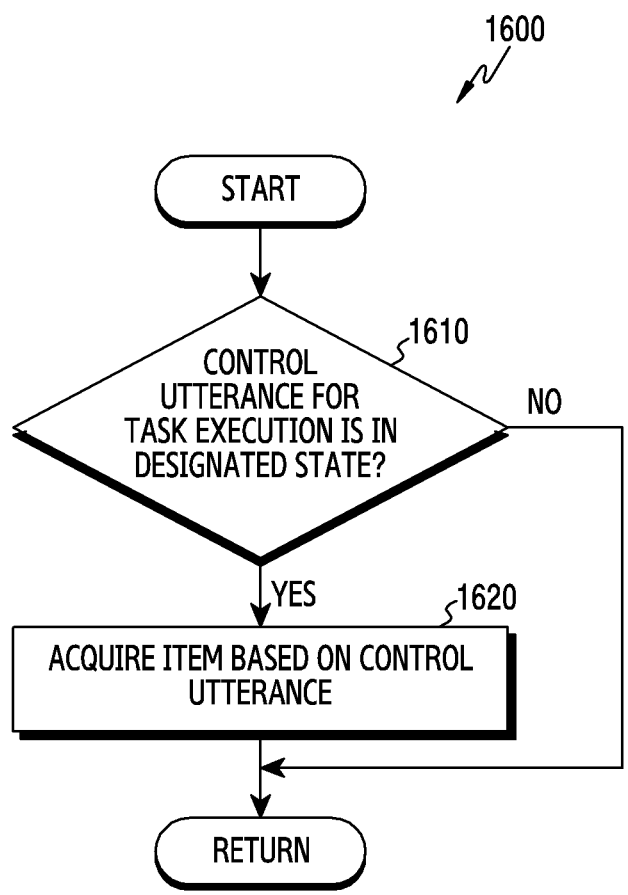
FIG. 16 is a flowchart illustrating another procedure of acquiring an item from a server according to various embodiments.

FIG. 16 is a flowchart 1600 illustrating another procedure of acquiring an item from a server according to various embodiments. The operations of FIG. 16 to be described below represent various embodiments of operation 1330 of FIG. 13. In the following embodiments, each operation may be sequentially performed, but is not necessarily performed sequentially. For example, the sequence of each operation may be changed, and at least two operations may be performed in parallel. The server of FIG. 16 may be the intelligent server 200 of FIG. 1.

Referring to FIG. 16, a server (e.g., the natural language platform 220 of FIG. 1) according to various embodiments may determine whether a control utterance for task execution is in a designated state in operation 1610. The control utterance may include a command (e.g., a quick command) mapped to a task.

A server (e.g., the natural language platform 220 of FIG. 1) according to various embodiments may acquire an item based on a control utterance in operation 1620. According to an embodiment, the natural language platform 220 may infer a task execution status based on a command mapped to the task. For example, when a command for task execution is related to "work", the natural language platform 220 may provide work hours, work places, control devices arranged at work places, etc., as items applicable to the task. In addition, when a command for task execution is related to "home", the natural language platform 220 may provide a time during which the user stays at home, a control device disposed at home, etc., as an item applicable to the task.

Although not shown, a server (e.g., the natural language platform 220 of FIG. 1) according to various embodiments may acquire or select at least one item which performs speaker classification and is provided to the electronic device 401. For example, the natural language platform 220 may acquire at least one item applicable to a task from among stored items based on the speaker's age, race, gender, and the like.

According to various embodiments, the server may acquire or select an item based on the control utterance, and then the operation thereof returns to FIG. 13. According to an embodiment, the server may perform an operation similar to or the same as operation 1340 of providing information on the acquired or selected item to an electronic device. Accordingly, the electronic device may select at least one item that is usable as a parameter, based on the received information.

According to various embodiments, a method for operating an electronic device may include: displaying at least one utterance related to the selected task as text in response to detecting a task selection event; identifying and displaying at least one replaceable parameter in the utterance; receiving a user input for selecting or inputting at least one item that is usable as the parameter; and storing a task including the item.

According to an embodiment, an event of selecting the task may include at least one of a mode for mapping at least one task to a command, a mode for changing at least one task mapped to the command, and a mode for outputting a result of recognition for a control utterance.

According to an embodiment, the method for operating an electronic device may further include mapping the selected task to one of a selected word, phrase, or sentence.

According to an embodiment, the method for operating an electronic device may further include displaying an interface configured to select the selected task. For example, the displaying of the interface may include: displaying the selected word, phrase, or sentence on a first area of the interface; displaying the text on a second area of the interface; and displaying the at least one item on a third area of the interface.

According to an embodiment, the displaying of the at least one item on the third area of the interface may include selecting the at least one item at least partially based on information related to a user account.

According to an embodiment, the displaying of the at least one item on the third area of the interface may include selecting the at least one item based on a type of a domain related to the selected task.

According to an embodiment, the selected task may include multiple actions using multiple application programs.

Although various embodiments of the disclosure have been described, various modifications and changes may be made thereto without departing from the scope of various embodiments of the disclosure. Therefore, the scope of various embodiments of the disclosure should not be defined as being limited to the embodiments, but should be defined by the appended claims and equivalents thereof.

The invention claimed is:

1. An electronic device comprising:
   a display;
   a communication interface;
   at least one processor; and
   at least one memory,
   wherein
   the at least one memory stores instructions which, when executed, cause the at least one processor to:
   display a user interface for setting or changing a task customized by a user on the display;
   display at least one utterance related to the task as text on the user interface;
   identify and display at least one replaceable parameter in the at least one utterance;
   select at least one item usable as the at least one replaceable parameter at least partially based on information related to a user account; and
   store the task including the at least one item.

2. The electronic device of claim 1, wherein the user interface includes:
   a first area including a selected word, a phrase, or a sentence;
   a second area including the text; and
   a third area including the at least one item.

3. The electronic device of claim 1, wherein the instructions cause the at least one processor to select the at least one item based on a type of a domain related to the task.

4. A method for operating an electronic device, the method comprising:
   in response to detection of a task selection event, displaying an interface for selecting a task:
   displaying at least one utterance related to the task as text;
   identifying and displaying at least one replaceable parameter in the at least one utterance;
   selecting at least one item usable as the at least one replaceable parameter at least partially based on information related to a user account; and
   storing the task including the at least one item.

5. The method of claim 4, wherein the task selection event comprises at least one of a mode for mapping at least one task to a command, a mode for changing at least one task mapped to the command, and a mode for outputting a result of recognition for a control utterance.

6. The method of claim 4, further comprising mapping the task to one of a selected word, phrase, or sentence.

7. The method of claim 6,
   wherein the displaying of the interface comprises:
   displaying the selected word, phrase, or sentence on a first area of the interface;
   displaying the text on a second area of the interface; and
   displaying the at least one item on a third area of the interface.

8. The method of claim 7, wherein the displaying of the at least one item on the third area of the interface comprises selecting the at least one item based on a type of a domain related to the task.

9. An intelligent server comprising:
   a communication interface;
   at least one processor; and
   at least one memory,
   wherein the at least one memory stores instructions which, when executed, cause the at least one processor to:
   receive at least one utterance related to a task from an electronic device;
   identify at least one replaceable parameter in the at least one utterance;
   select at least one item usable as the at least one replaceable parameter at least partially based on information related to a user account; and
   transmit the selected at least one item to the electronic device.

10. The intelligent server of claim 9, wherein the instructions cause the at least one processor to select the at least one item based on a type of a domain related to the task.

11. The intelligent server of claim 9, wherein the instructions cause the at least one processor to:
    receive a command mapped to the task from the electronic device; and
    select the at least one item based on the received command.

12. The intelligent server of claim 9, wherein the instructions cause the at least one processor to:
    determine a domain related to the at least one utterance; and
    select the at least one item through a capsule corresponding to the determined domain.

* * * * *